United States Patent
DeMaio

(10) Patent No.: US 11,237,601 B2
(45) Date of Patent: Feb. 1, 2022

(54) MAGNETICALLY CONNECTIBLE SMARTPHONES AND MOBILE DEVICES WITH ROTATABLE MECHANISMS

(71) Applicant: Robert Charles DeMaio, Incline Village, NV (US)

(72) Inventor: Robert Charles DeMaio, Incline Village, NV (US)

( * ) Notice: Subject to any disclaimer, the term of this patent is extended or adjusted under 35 U.S.C. 154(b) by 0 days.

(21) Appl. No.: 17/443,600

(22) Filed: Jul. 27, 2021

(65) Prior Publication Data
US 2021/0357001 A1 Nov. 18, 2021

Related U.S. Application Data

(63) Continuation-in-part of application No. 17/092,621, filed on Nov. 9, 2020, which is a continuation of application No. 16/577,594, filed on Sep. 20, 2019, now Pat. No. 10,831,244, which is a continuation-in-part of application No. 29/706,209, filed on Sep. 18, 2019, now Pat. No. Des. 918,898.

(51) Int. Cl.
*G06F 1/16* (2006.01)
*E05D 3/06* (2006.01)

(52) U.S. Cl.
CPC ............ *G06F 1/1681* (2013.01); *E05D 3/06* (2013.01); *G06F 1/1624* (2013.01); *G06F 1/1626* (2013.01); *E05Y 2900/606* (2013.01)

(58) Field of Classification Search
CPC .... G06F 1/1615; G06F 1/1616; G06F 1/1633; G06F 1/1641; G06F 1/1681; G06F 1/1692
See application file for complete search history.

(56) References Cited

U.S. PATENT DOCUMENTS

| | | | |
|---|---|---|---|
| 2012/0139815 A1* | 6/2012 | Aono | G06F 1/1677 345/1.3 |
| 2013/0076597 A1* | 3/2013 | Becze | G02B 6/0001 345/1.3 |
| 2016/0284497 A1* | 9/2016 | Stryker | H03K 17/96 |
| 2017/0179661 A1* | 6/2017 | Szeto | G06F 1/1654 |
| 2017/0257146 A1* | 9/2017 | Szeto | H02J 50/10 |
| 2018/0052497 A1* | 2/2018 | Maatta | E05D 3/12 |
| 2019/0004764 A1* | 1/2019 | Son | G06F 1/1654 |
| 2021/0157357 A1* | 5/2021 | Wang | G06F 1/1641 |

* cited by examiner

*Primary Examiner* — Anthony Q Edwards
(74) *Attorney, Agent, or Firm* — Tatonetti IP

(57) ABSTRACT

Primary and companion smartphones and mobile devices are configured with magnetic connection mechanisms in which stagnant connectors are positioned at respective cutouts on the smartphones, and the connectors magnetically connect to each other. Each cutout includes a spacer that retracts and extends based on the rotational movement of the smartphones. The cutout, connectors, and spacers on each of the primary and companion smartphones are substantially identical and have similar configurations. Each connector is magnetized to enable attraction when both devices are adjacent to each other. Each magnetized connector is connected to an electromagnet wire (e.g., a copper wire), which is internal to each computing device that delivers electricity to the magnetic connectors to create magnetism. The electromagnet wires may receive an electrical current from respective batteries internal to the smartphones to which an end of the wire is connected.

20 Claims, 24 Drawing Sheets

Hinge pin

Rotatable shaft

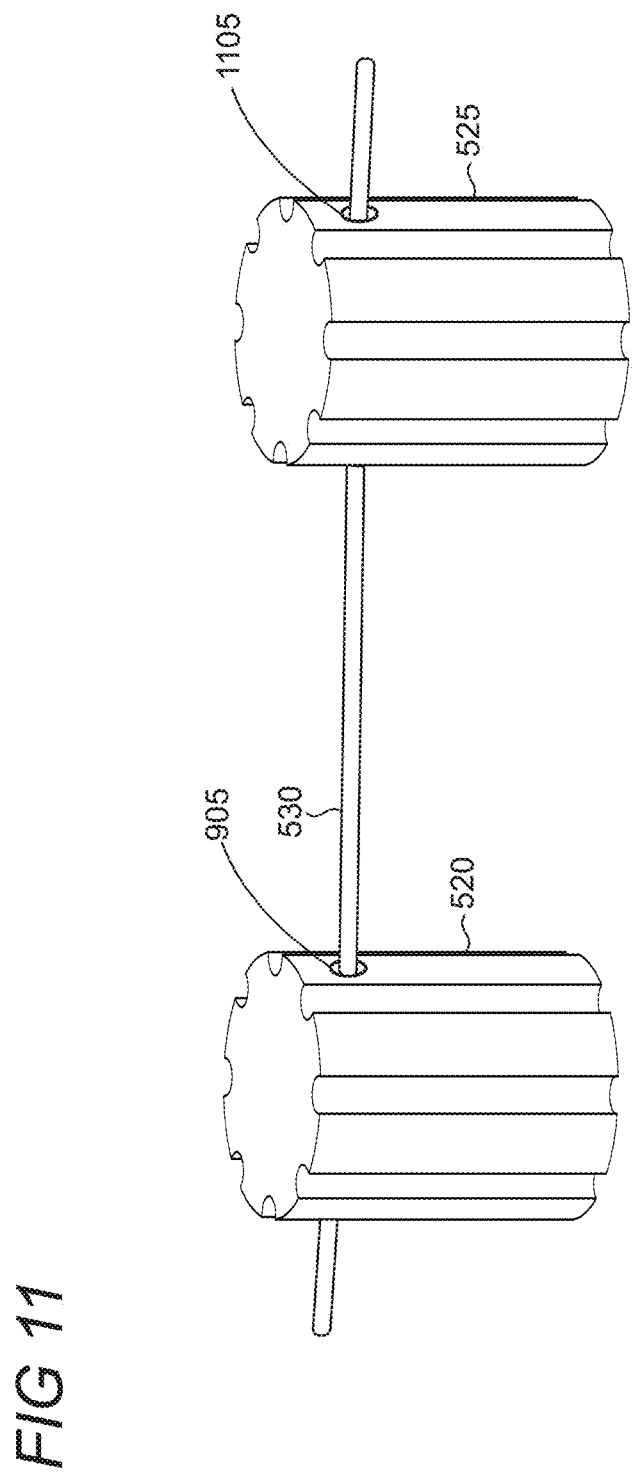

Slid over to companion Smartphone

Slid back over to primary Smartphone

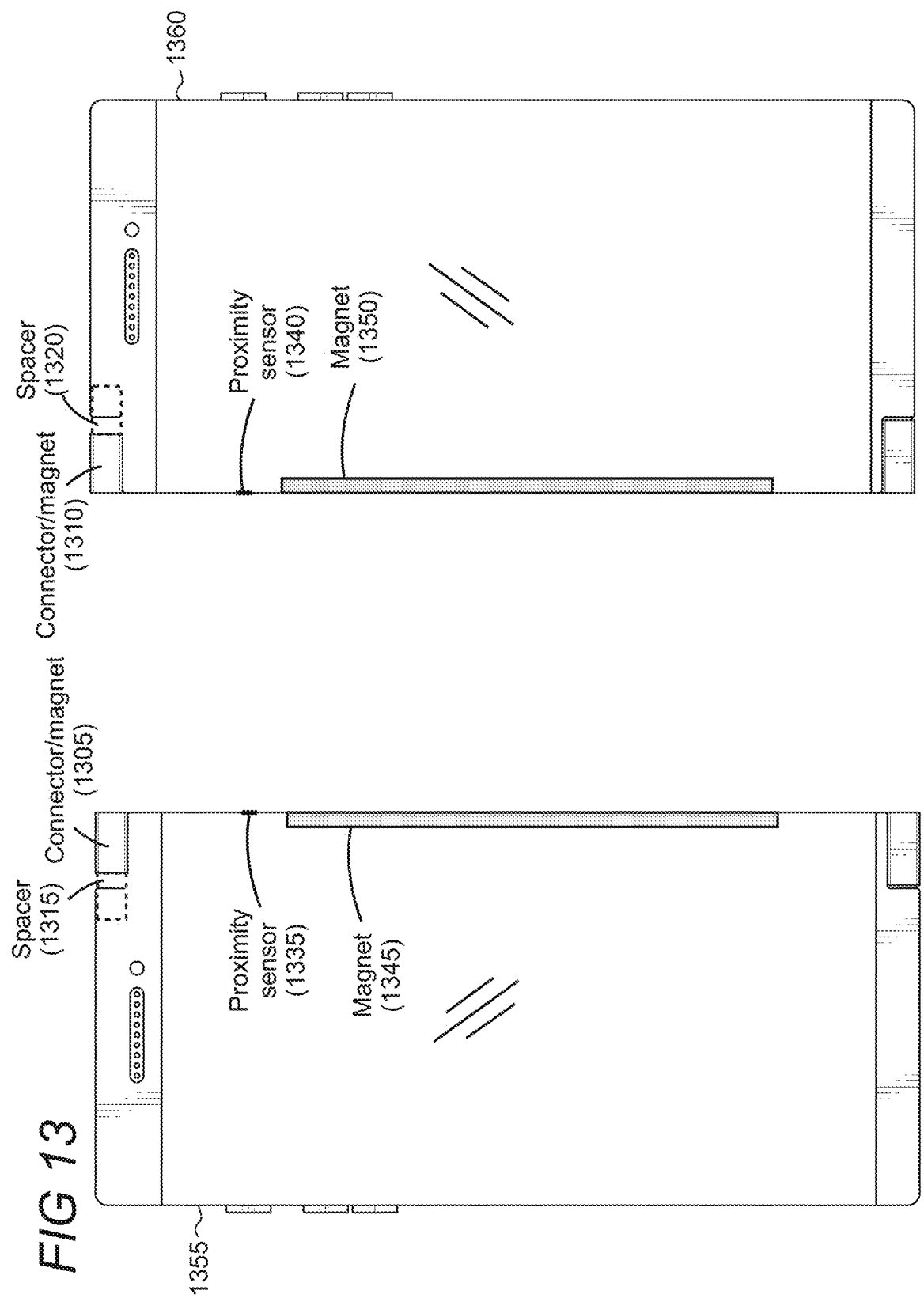

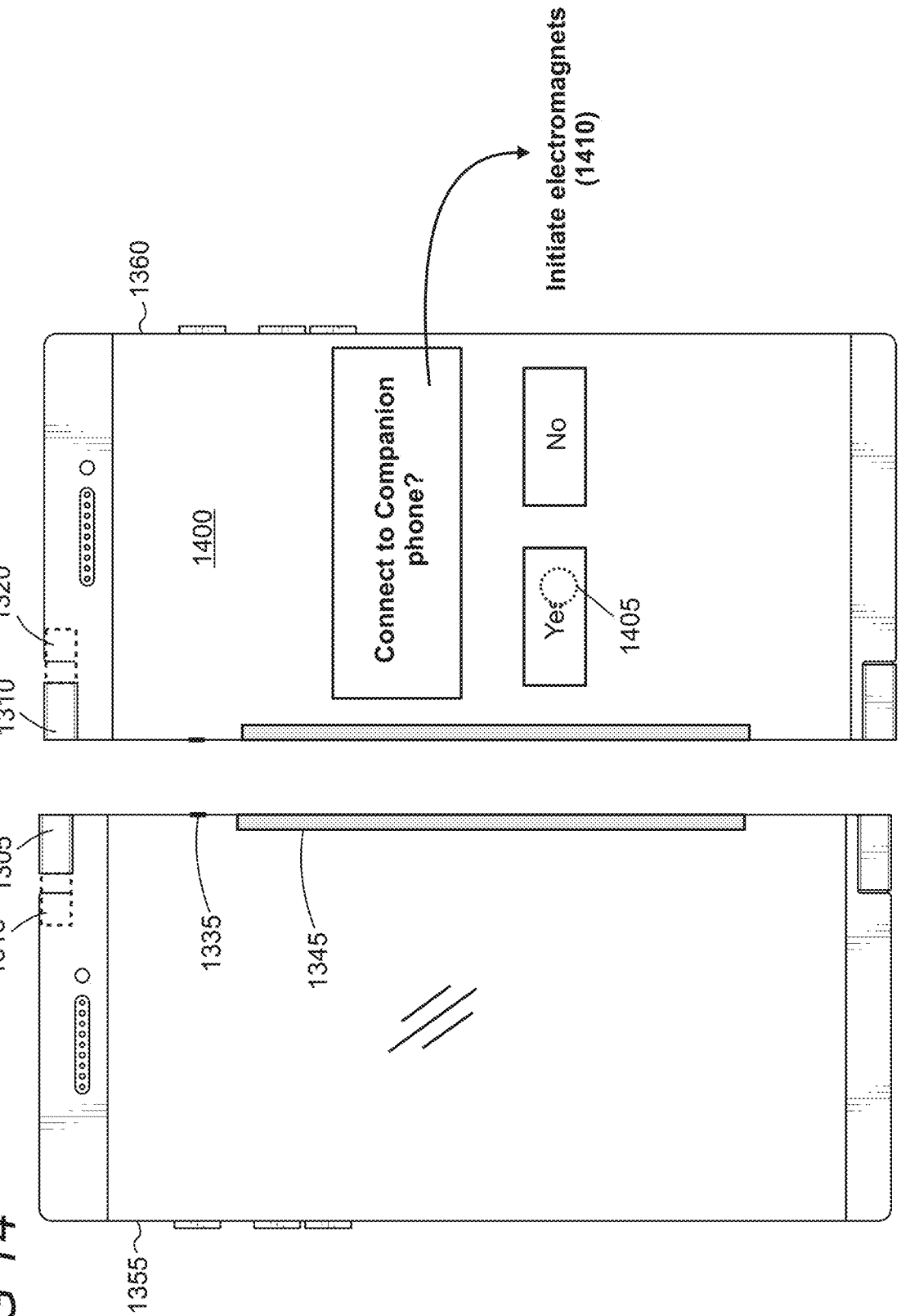

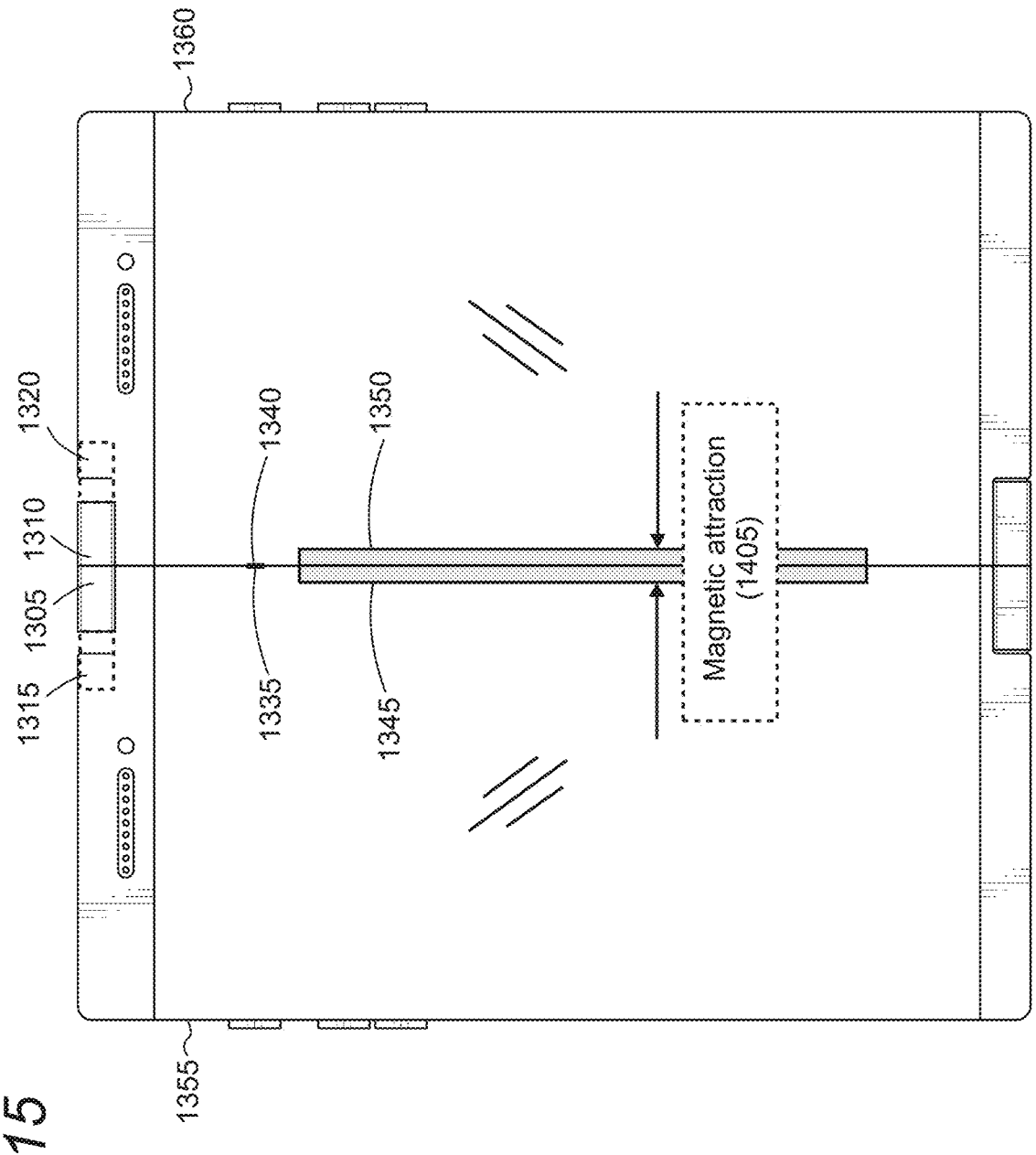

FIG 17
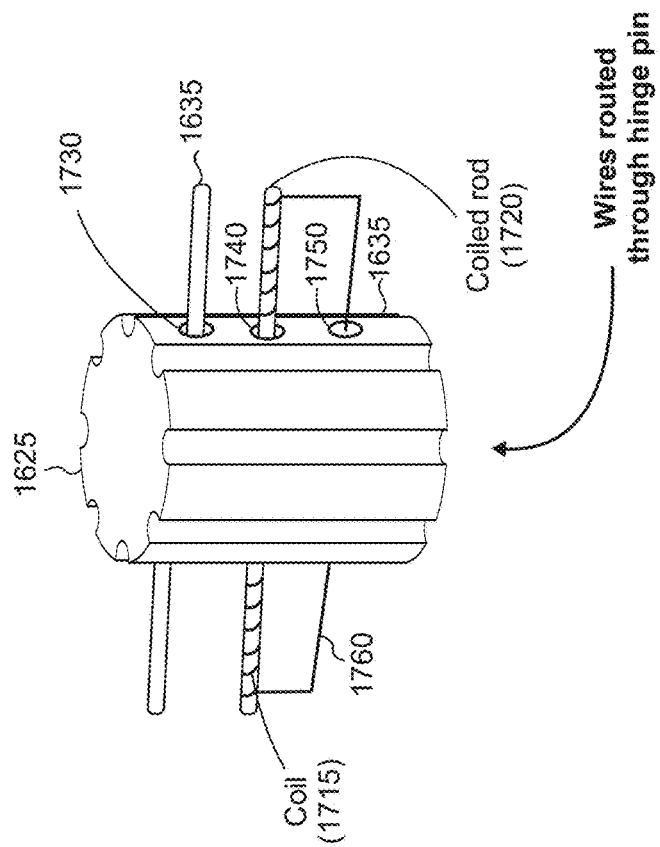
Primary computing device 1310
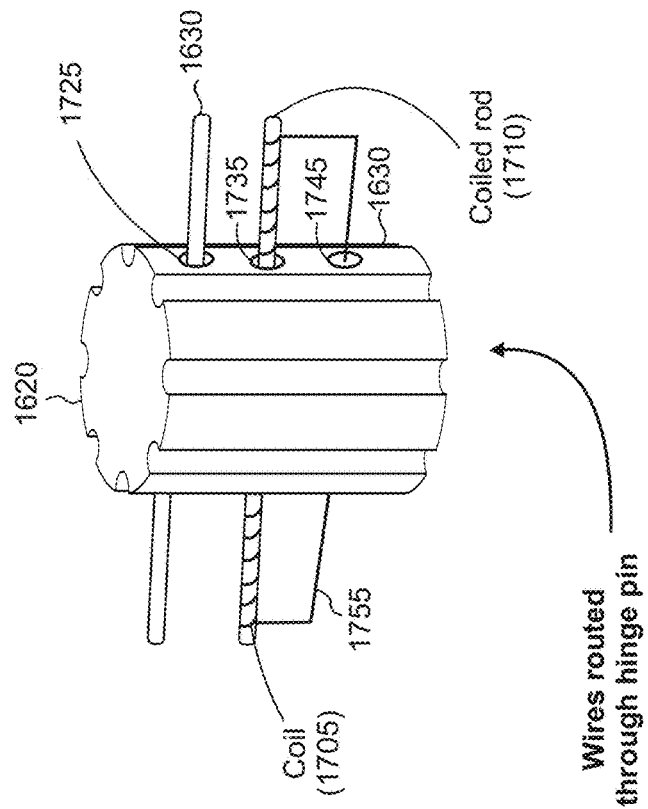
Companion computing device 1305

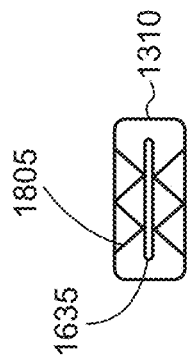
FIG 18B
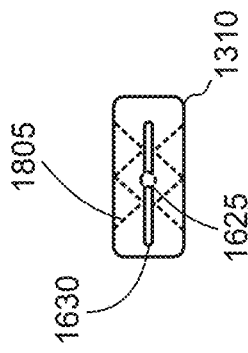
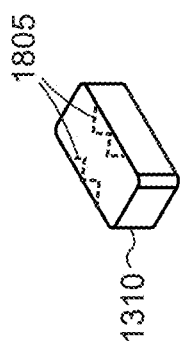
FIG 18A
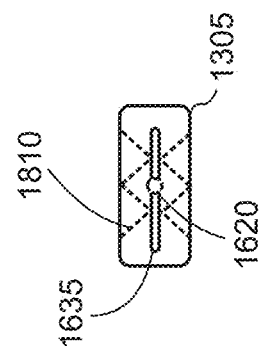
FIG 18C

MAGNETICALLY CONNECTIBLE SMARTPHONES AND MOBILE DEVICES WITH ROTATABLE MECHANISMS

CROSS-REFERENCES TO RELATED APPLICATIONS

This Non-Provisional Utility patent application is a Continuation-In-Part (CIP) application of U.S. patent application Ser. No. 17/092,621, entitled "Hinge Mechanism for Electronic Devices," filed Nov. 9, 2020, which is a Continuation application that claims the benefit of and priority to U.S. patent application Ser. No. 16/577,594, entitled "Hinge Mechanism for Electronic Devices," filed Sep. 20, 2019, which is a Continuation-In-Part (CIP) application of U.S. Design patent application Ser. No. 29/706,209, entitled "Electronic Device," filed Sep. 18, 2019, the entire contents of each application of which is hereby incorporated herein by reference.

BACKGROUND

Smartphone computers are typically utilized individually by a user or, in some scenarios, can be supplemented by an additional computing device using a wired or wireless (e.g., Bluetooth®) connection. Typically, the smartphone may be connected to a user's personal computer (PC) or laptop using a universal serial bus (USB) or another connector to transfer media files like photos or music. Users with multiple smartphones may find it tedious to effectively leverage the operations and functionality of both phones simultaneously, if at all. Some smartphone devices utilize a foldable screen, but these implementations can have durability issues.

SUMMARY

A connection mechanism for electronic devices is implemented by which a user can mechanically and communicatively connect two devices together. Authorized connection of the two devices can enable each device to leverage the partner device's functionality, battery power, applications, screen real estate, etc. While the disclosure herein references a primary smartphone and a companion smartphone as the two electronic devices, other types of electronic devices for the present implementation are also possible, such as tablets and laptop computers.

Each smartphone supports a rotatable cylindrical shaft that is positioned adjacent an edge of the respective phone. The rotatable shaft may be positioned on a left side portion of a primary smartphone and a right side portion of a companion smartphone. Respective hinge pins are positioned inside cavities of the rotatable shafts and extend from the inside to an outside of the primary and companion smartphones. The hinge pin on the companion smartphone is protected via a sliding element that locks into place above the hinge pin. Likewise, the hinge pin on the primary smartphone is protected via a separate sliding element that locks into place above its hinge pin.

The sliding elements fill a cutout on the respective smartphones, which are constructed for the connecting mechanism. The primary and companion smartphones include sliding elements that facilitate a connection between the devices. Each smartphone also includes a spacer that contracts and extends responsively to the movement of the sliding elements. The primary smartphone's spacer is in a contracted position and inserted into the device's housing when the smartphone is unconnected to the companion device. The companion smartphone's spacer is in an extended position partially outside of the companion device and partially inside of the companion device when the companion smartphone is unconnected to the primary smartphone. When connected, and the smartphones are rotated in either direction, the companion and primary smartphone's spacer is inserted into the device's housing by being pushed in by the sliding element. The primary smartphone spacer extends partially outward from the housing when the primary smartphone is unconnected and connected to the companion smartphone.

When opposing edges of the primary smartphone and the companion smartphone are touching, each sliding element moves left; that is, the companion smartphone's sliding element moves to an end of its cutout, thereby pushing the spacer inward, and the primary smartphone's sliding element overlaps with the cutout on the primary and companion smartphones to form a connection. In typical implementations, the cutout on the primary smartphone is substantially a one-to-one ratio to the size of the sliding element. Positioned underneath and attached to the primary smartphone's sliding element is a locking pin that dually connects to the primary and companion smartphone's respective hinge pins. Each sliding element comes equipped with a locking mechanism (e.g., a structural configuration that functions as a cotter pin or split pin) that engages and disengages with one or more of the hinge pins responsive to manual pressure and secures the components together.

Each rotatable shaft is configured with spring-loaded tabs that secure against corresponding spaced notches on the hinge pins. In typical implementations, each rotatable shaft and hinge pin have eight spring-loaded tabs and notches, respectively, which are evenly distributed about 360°. The rotatable shaft rotates about the hinge pin, which is fixed in place via the locking pin that dually and simultaneously engages the respective smartphone's hinge pins. Rotation of a rotatable shaft corresponds to the movement of the respective smartphone relative to the partner smartphone. The spring-loaded tabs disengage from the hinge pin's notches responsive to receiving pressure from the device user (e.g., by manipulating one or both smartphones) and re-engaging when the tabs and notches align again. Each rotatable shaft can operate individually or in combination with the other rotatable shaft. For example, to find an ideal position, a user can manipulate only the primary smartphone relative to the companion phone or vice versa or manipulate both smartphones simultaneously relative to each other.

In another embodiment, a magnetic connection mechanism may be utilized in which stagnant connectors are positioned at a cutout on a primary and companion smartphone. Each cutout includes a spacer that retracts and extends based on the rotational movement of the connectors. In this embodiment, the cutout, connectors, and spacers on each of the primary and companion smartphones are substantially identical and have similar configurations.

Each connector is magnetized to enable attraction when both devices are adjacent to each other. Each magnetized connector is connected to an electromagnet wire (e.g., a copper wire), internal to each computing device that delivers electricity to the magnetic connectors to create magnetism. Alternatively, only one of the devices, such as the primary smartphone, may utilize the electromagnet and the charge goes through to the secondary device. The electromagnet wire may receive an electrical current from a battery internal to the primary smartphone to which an end of the wire is operatively connected.

When the user wishes to connect the primary to the companion smartphone and presses a button (e.g., displayed on the screen's user interface, mechanical button on the device, etc.) initiating the connection, the smartphone allows current to flow to the electromagnetic wire. An opposite end of the electromagnetic wire is connected to the primary smartphone's connector. Internal to the connector may be a coil around a rod. The current flow around the coil causes the electromagnetism of the temporary magnet until the current is switched off responsive to user input switching off the connection.

In an alternative embodiment, each smartphone may be configured with a proximity sensor that detects when an opposing smartphone is approaching or engaged. Upon detection of an adjacent smartphone, one or both of the primary or companion smartphones may initiate electromagnetism.

The electromagnetic current causes the primary smartphone's connector to connect to the secondary smartphone's connector. The current flow may extend through the connectors to magnetize the secondary smartphone's connector as well. Alternatively, the secondary smartphone may utilize its own internal electromagnetic wire and coil setup, similar to the primary smartphone's setup, for magnetism. Furthermore, the primary and companion smartphones may each have permanent magnets on opposing edges to provide a greater connection between the devices. The permanent magnets may have opposing north or south polarities on each phone to establish magnetic attraction.

Similar to the other embodiment, each smartphone supports a rotatable cylindrical shaft positioned near the respective phone's edge. The rotatable shaft may be positioned on a left side portion of a primary smartphone and a right side portion of a companion smartphone. Respective hinge pins are positioned inside cavities of the rotatable shafts and extend outside from the primary and companion smartphones. In the magnetized embodiment, the hinge pins on the primary and companion smartphones are protected and locked in place via respective locking pins. In contrast to the other embodiment, in the magnetized configuration, the primary and companion smartphones may have their own distinct locking pins that attach to respective hinge pins. The use of independent locking and hinge pin setups creates the static configuration of the connectors; that is, the connectors are prevented from moving left to right.

Each rotatable shaft is configured with spring-loaded tabs that secure against corresponding spaced notches on the hinge pins. In typical implementations, each rotatable shaft and hinge pin have eight spring-loaded tabs and notches, respectively, which are evenly distributed about 360°. The rotatable shaft rotates about the hinge pin, which is fixed in place via the locking pin that dually and simultaneously engages the respective smartphone's hinge pins. Rotation of a rotatable shaft corresponds to the movement of the respective smartphone relative to the partner smartphone.

Since the connectors rotate responsive to user rotation of the primary and companion smartphones, the spacers can dynamically retract and extend responsively to pressure exerted by the connectors. Thus, for example, if the primary smartphone rotates and is at a diagonal angle relative to the connector, then the connector's corner may push the spacer in slightly. The spacer can continue to extend and retract dynamically. The width of the spacer and distance of the connector's end to the cutout's end may correspond to the space necessary for the connector to rotate while not being blocked by the surface of the cutout's wall. The companion smartphone is configured similarly to the primary smartphone.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 11 shows an illustrative representation of the locking pin extending through the primary and companion smartphone's hinge pins;

FIG. 13 shows an illustrative representation of a connecting embodiment of the primary and companion smartphones using magnetic attraction and magnetic connectors;

FIG. 14 shows an illustrative representation of the primary smartphone receiving user input to initiate electromagnets;

FIG. 15 shows an illustrative representation of the primary and companion smartphones connecting using magnetic attraction;

FIG. 17 shows an illustrative representation of the primary and companion smartphone's hinge pins utilizing a coiled rod;

FIGS. 18A and B show illustrative representations of the connector with locking pin in the magnetic connection embodiment;

FIG. 18C shows an illustrative representation of the primary and companion smartphones' connector and hinge pin setup;

Like reference numerals indicate like elements in the drawings. Elements are not drawn to scale unless otherwise indicated.

DETAILED DESCRIPTION

Figure 1:
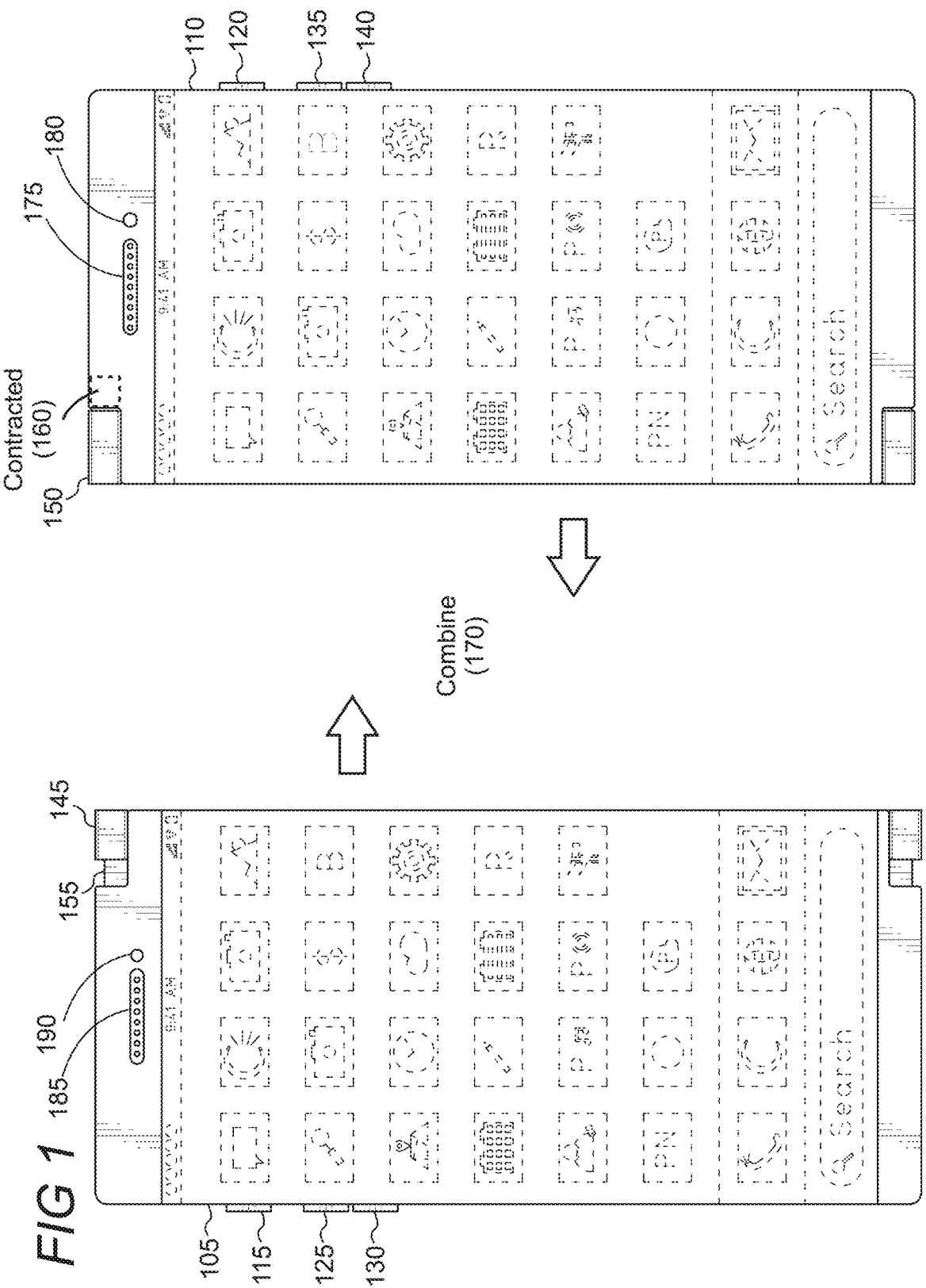
FIG. 1 shows an illustrative representation of a primary smartphone and companion smartphone adjacently positioned.

FIG. 1 shows an illustrative environment in which a primary smartphone 110 and companion smartphone 105 are positioned adjacent to each other. A user may wish to combine 170 the smartphones to, for example, form a single display screen or charge the other phone's battery. The disclosure herein references the connection mechanisms positioned on the top of the respective smartphones as a reference, but the bottom of each smartphone has symmetrical components which operate like the top. Thus, any discussion pertaining to the top of the connection mechanisms herein additionally applies to the connection mechanisms positioned on the bottom of the respective smartphones.

Each smartphone device can be configured with components to operate as computing devices, including one or more processors, memory, input/output buttons, network interface controllers (NICs), and the like. For example, each smartphone has a power button 115, 120, an increase volume button 125, 135, and a decrease volume button 130, 140. The smartphones additionally have speakers 185, 175 to, for example, listen to phone calls and a front-facing camera 180, 190 for capturing images or video.

Figure 3:
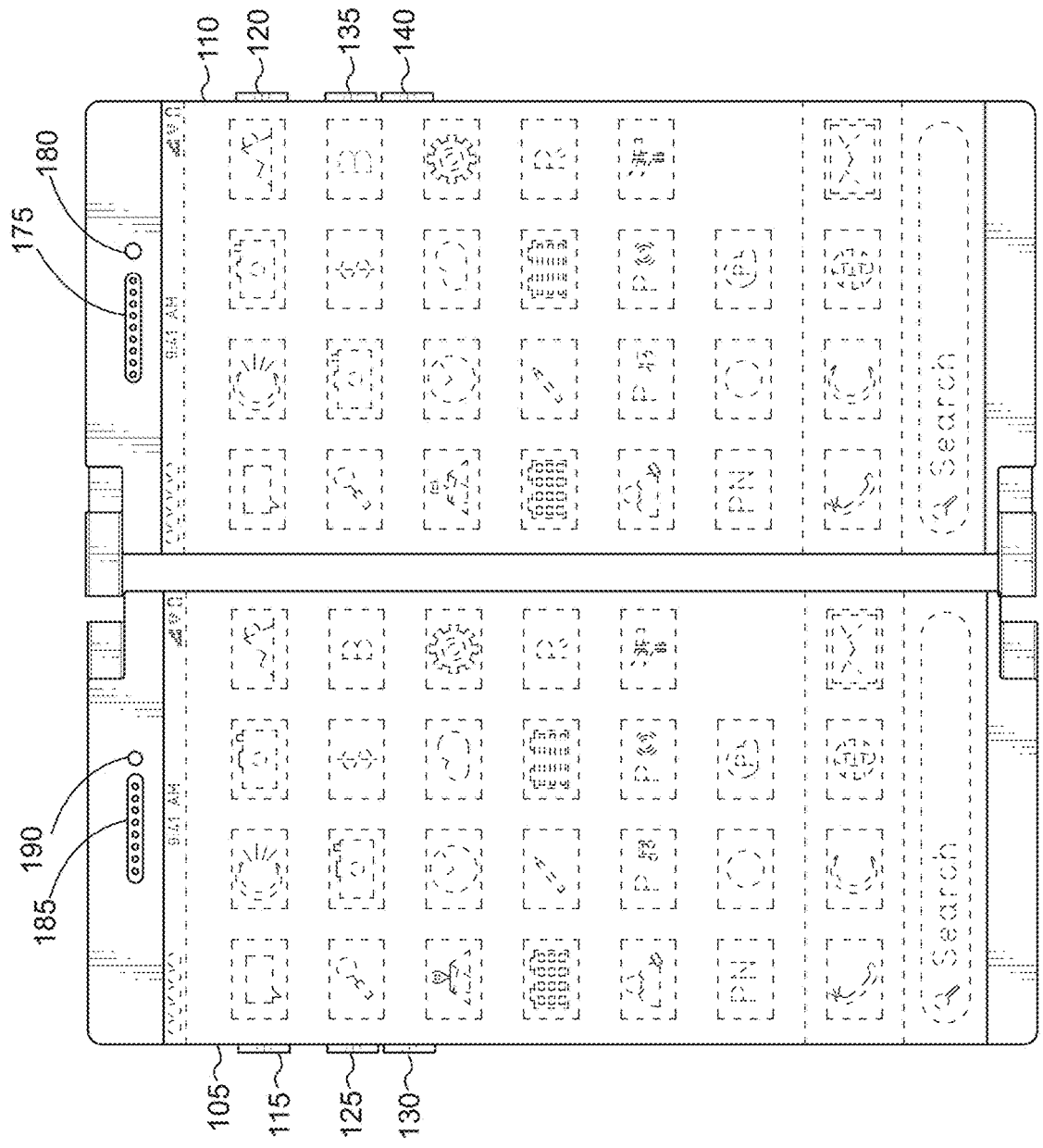
FIG. 3 shows an illustrative representation of the primary and companion smartphones being partially combined.
Figure 4:
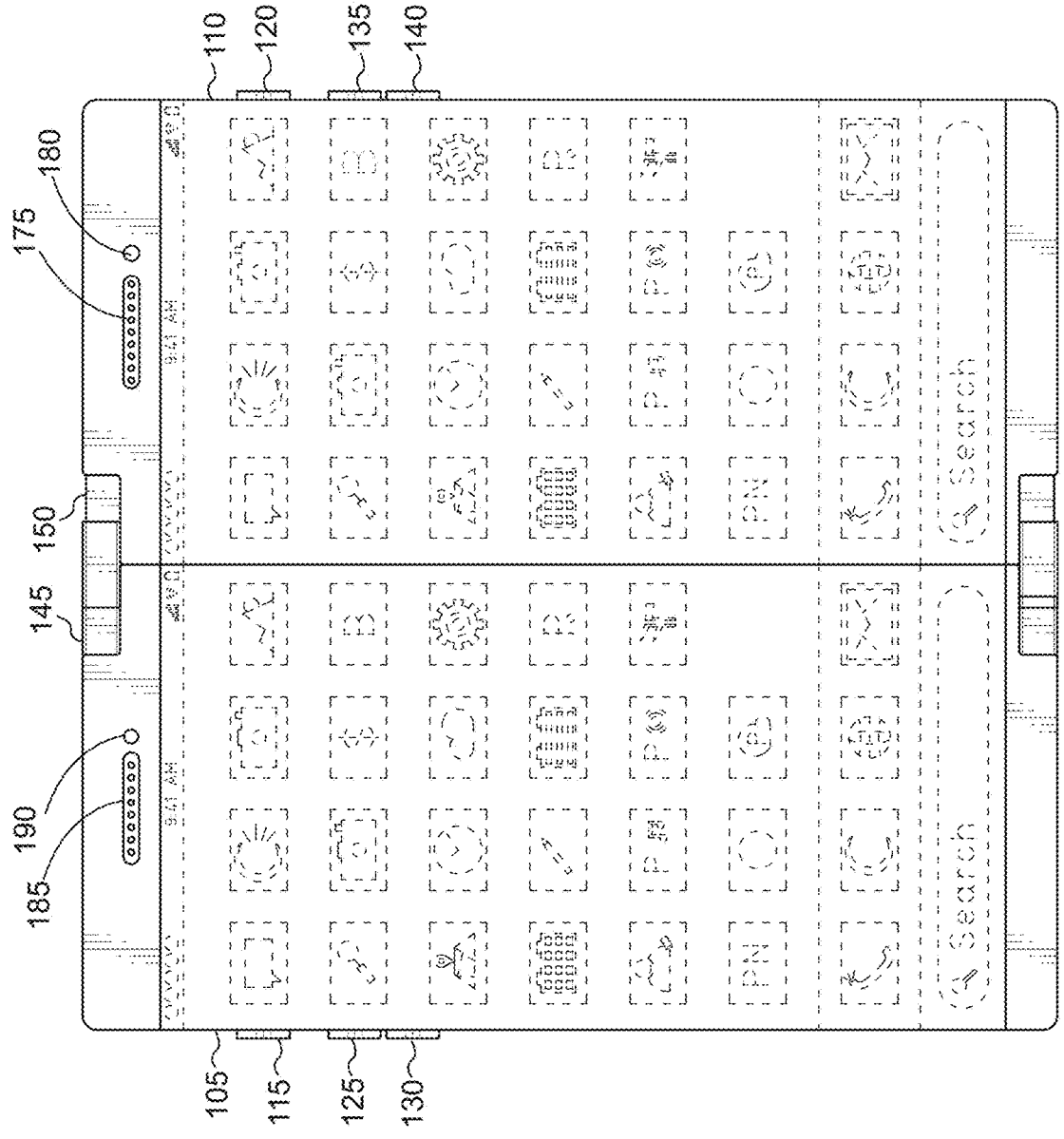
FIG. 4 shows an illustrative representation of the primary and companion smartphones fully combined.

When a user wishes to combine 170 smartphones, the user may adjacently position the smartphones such that the edges are touching (FIGS. 3-4). Each smartphone has respective sliding elements 145 and 150. The sliding element 145 on the companion smartphone 105 is implemented to protect a hinge pin (not shown in FIG. 1) positioned underneath it and which extends from the top and bottom of the smartphone's casing. The sliding element 150 on the primary smartphone 110 likewise protects a hinge pin positioned underneath it, extending from the smartphone's casing. The primary smartphone's sliding element 150 is secured in place to the spacer 160 positioned to the right of the sliding element on a wall of the cutout in which the sliding element is positioned. The sliding elements may be connected to their spacers in various ways, including welded or permanently connected to each other, adhesive, friction fit, tab and notch, male connector to female receptacle, or any combination thereof. The cutout is larger on the companion smartphone to accommodate the entire sliding element 145 and at least approximately half, or at least a portion, of the sliding element 150.

Figure 2:
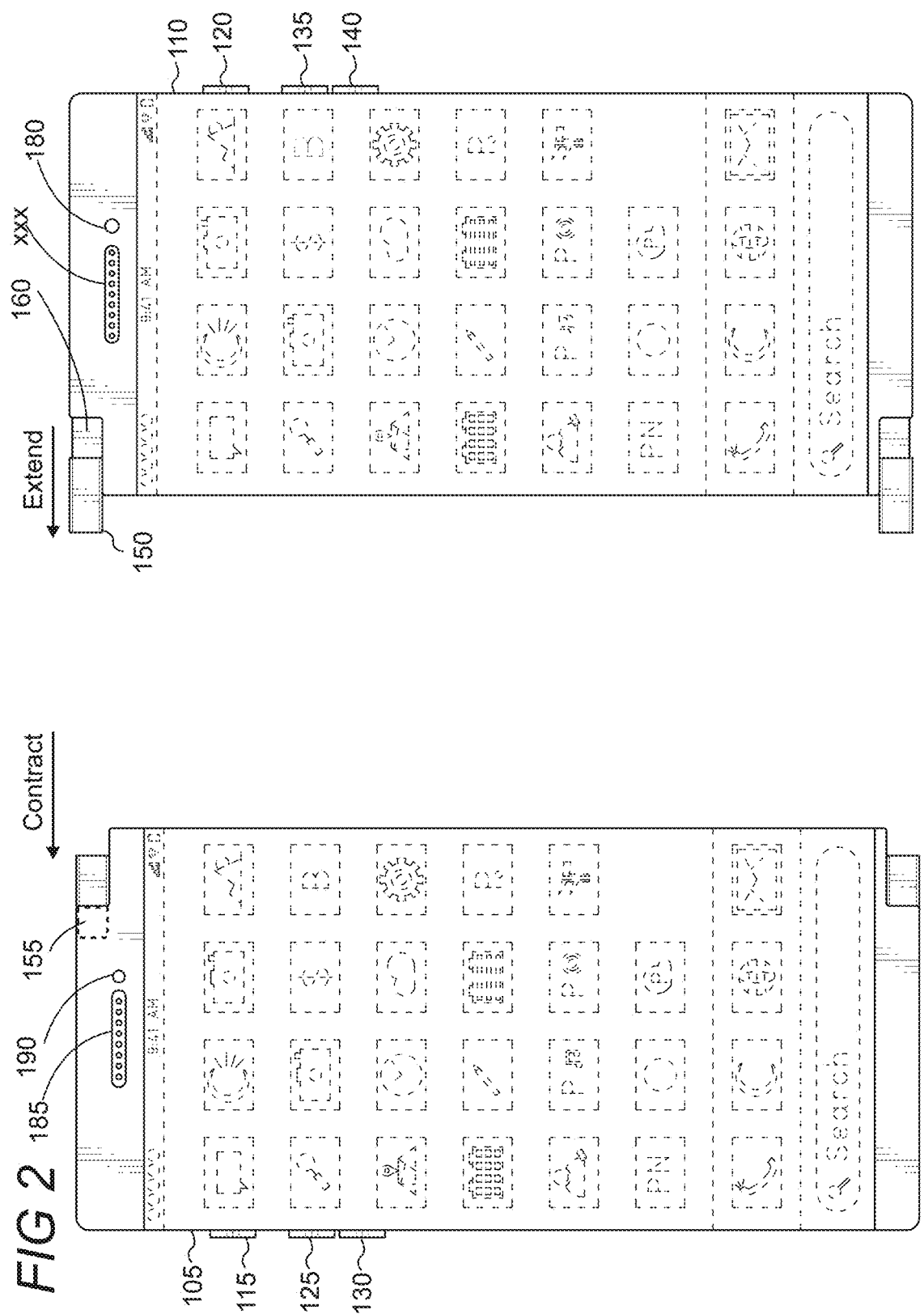
FIG. 2 shows an illustrative representation of the connectors on the primary and companion smartphones adjusting.

FIG. 2 shows an illustrative representation in which the companion smartphone's sliding element 145 is contracted and the primary smartphone's sliding element 150 is extended. Likewise, the companion smartphone's spacer 155 is contracted into the smartphone's housing, and the primary smartphone's spacer 160 extends out from the casing. The primary smartphone's spacer may be spring-loaded and utilize a cam that rotates to force the spacer in a retracted and extended position. Pushing the spacer inward causes the spring to retract, the cam to rotate, and accordingly the spacer to enter the retracted or extended position. This re-positioning of each sliding element occurs when a user wishes to connect the phones together.

FIG. 3 shows an illustrative representation in which the primary and companion smartphones 110, 105 are partially combined 305. Each of the smartphones' sliding elements is in place to enable a full connection between the devices.

FIG. 4 shows an illustrative representation in which the primary and companion smartphones are fully combined 405. The companion smartphone 105 and the primary smartphone 110 are positioned adjacent to each other, and opposing edges are touching. The sliding elements 145 and 150 have slid to the left, such that the sliding elements are touching or near-touching responsive to manual manipulation by a user. The respective cutouts and sliding elements may have corresponding or complementary grooves or tracks to enable the sliding movement. Sliding the sliding elements over causes the sliding element 150 to overlap simultaneously with the primary and companion smartphones. The sliding element 150 engages with the companion smartphone's hinge pin, which was previously protected by the companion smartphone's sliding element 145. A locking pin affixed to the sliding element 150 correspondingly moves with the sliding element and dually engages with hinge pins extending from the primary and companion smartphones (not shown in FIG. 4).

When both smartphones are connected, one phone may charge the other phone depending on the user's preferences. For example, the user may select for the companion device to charge the primary device if the primary device's battery is running low, or vice versa.

Figure 5:
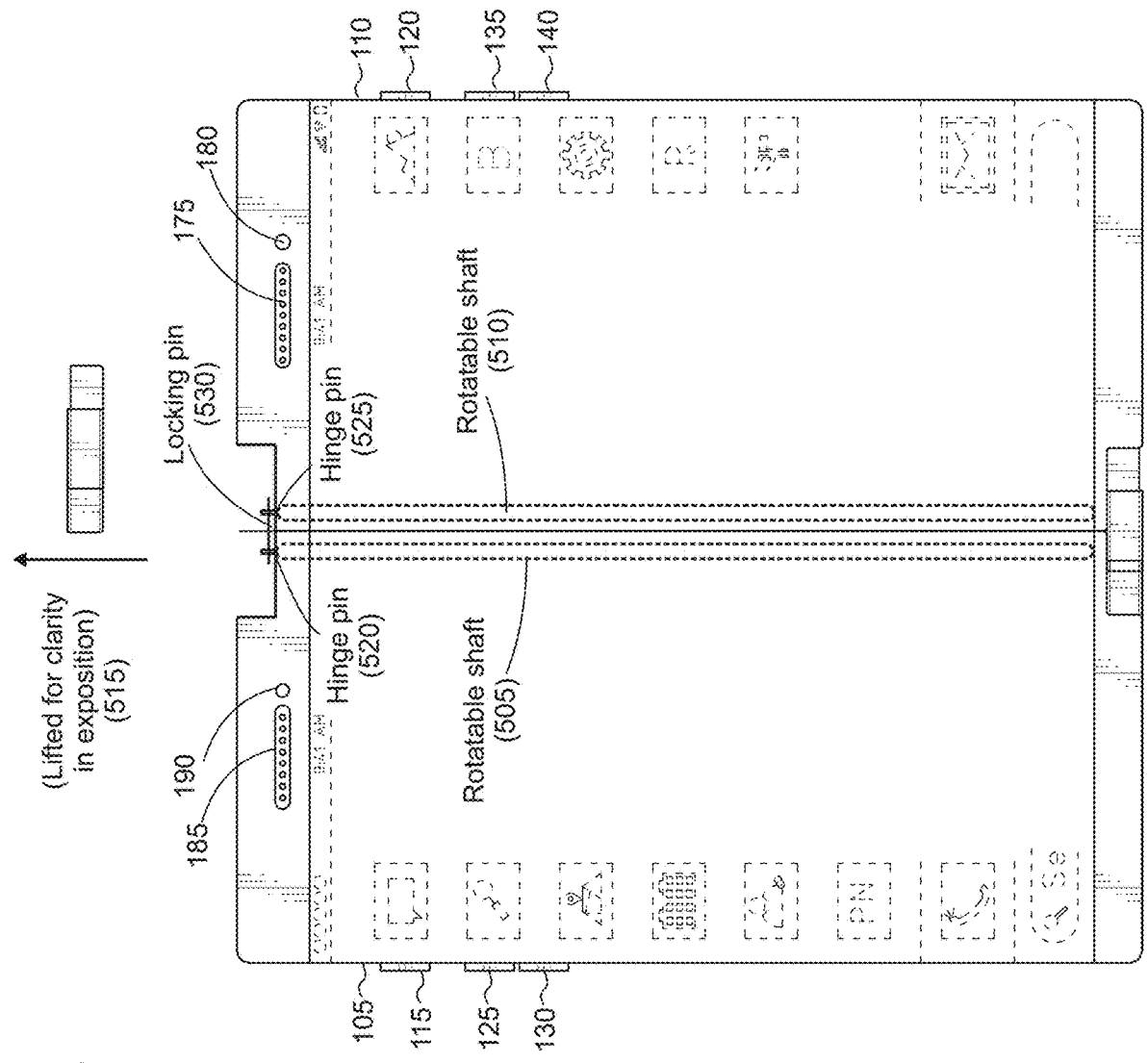
FIG. 5 shows an illustrative representation of the smartphones' operable components for connecting and rotating relative to each other.

FIG. 5 shows an illustrative environment in which components of the hinge mechanism are exposed. Sliding elements 145 and 150, in FIGS. 1-4, have been lifted to expose the components of the hinge mechanism, as representatively shown by numeral 515. Unless otherwise indicated, the drawings are not drawn to scale and are represented for clarity in exposition.

A cylindrical rotatable shaft 510 extends vertically through the left side of the primary smartphone 110, and a cylindrical rotatable shaft 505 extends vertically through the right side of the companion smartphone 105. Hinge pins 520 and 525 are respectively positioned inside a cavity of the rotatable shafts 505, 510 and extend out a top and bottom of the respective smartphone's housing. The locking pin 530 extends perpendicularly through holes (not shown in FIG. 5) on each hinge pin to lock and prevent the hinge pins' movement. Each component (e.g., the rotatable shafts, hinge pins, locking pins) of the hinge system may be comprised of titanium to create a reliable and resistant system, although other types of metals suitable for the purposes discussed herein are also possible.

Each sliding element 145, 150 comes equipped with a locking mechanism (not shown in FIG. 5) attached thereto, which structurally and functionally operates as a cotter or split pin, and which engages with the hinge pins. The locking mechanism may be an additional component attached to the sliding element or formed of the same piece of material. Manual pressure on a sliding element causes the locking mechanism to engage with the hinge pins 520, 525. The locking mechanism on the primary smartphone's sliding element prevents the sliding element from disengaging with the hinge pin. Since the locking pin dually engages with and prevents rotational movement of each hinge pin, the locking mechanism prevents the sliding element 150 from moving and thereby the locking pin from disengaging with the hinge pins, such as when the user is rotating the smartphones and the rotatable shaft. Typically, the locking mechanism simultaneously locks and unlocks in place with each hinge pin responsive to user manipulation.

The rotatable shafts are attached to the respective smartphones such that movement of the rotatable shaft translates to movement of the smartphone, and vice versa. The rotatable shafts may be integrated with the smartphone by being mounted to and/or welded to its internal casing. The rotatable shafts are bi-directional (i.e., they move clockwise and counterclockwise). The movement of each rotatable shaft is independent of the other and can also dually operate in tandem to provide users with greater freedom in selecting the hinge's position. For example, the companion smartphone's rotatable shaft can move relative to the future smartphone, the future smartphone's rotatable shaft can move relative to the companion smartphone, or both can move together to increase the number of available positions to the user.

Figure 7:
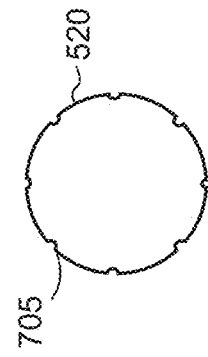
FIG. 7 shows an illustrative representation of a hinge pin.
Figure 6:
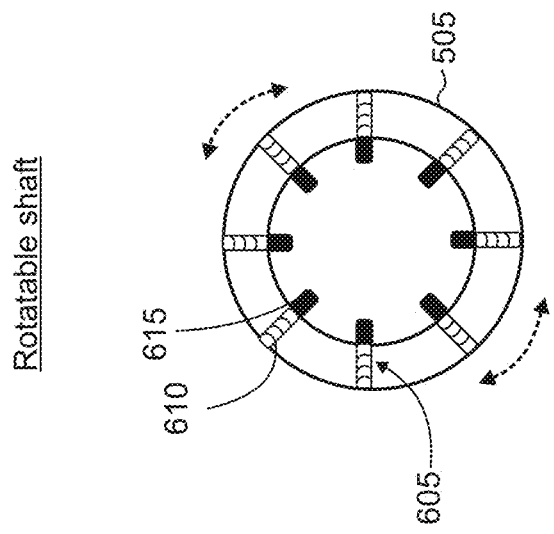
FIG. 6 shows an illustrative representation of a rotatable shaft.

FIGS. 6 and 7 show illustrative structural diagrams of the rotatable shaft 505 and hinge pin 520, respectively. The rotatable shaft includes spring-loaded tabs 605, including springs 610 and tabs 615, which move forward and backward based on the pressure exerted against the springs. The hinge pin includes spaced-apart notches (or grooves) 705 around its perimeter, which corresponds to the positioning of the spring-loaded tabs. The spring-loaded tabs snap into place when aligned with the notches of the hinge pin.

Figure 9:
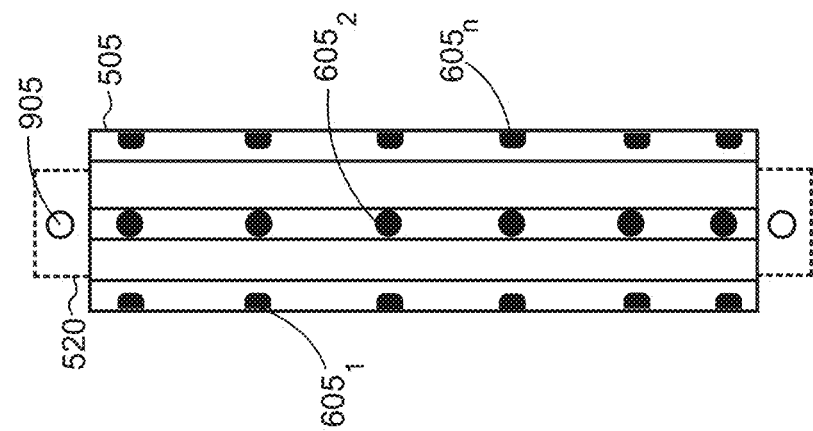
FIGS. 8 and 9 show illustrative representations of the rotatable shaft and hinge pin.
Figure 8:
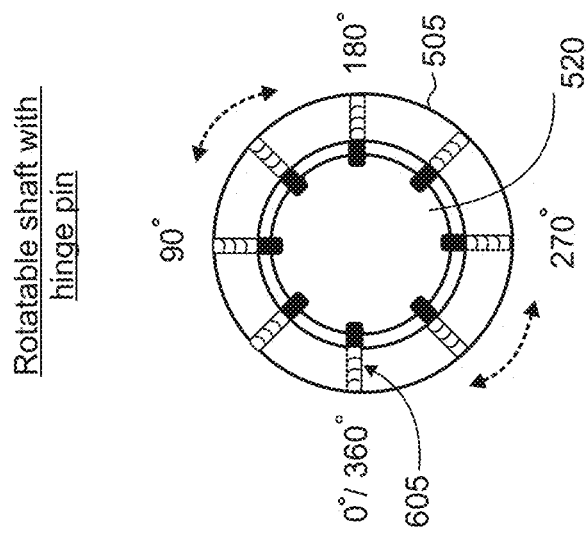

FIG. 8 shows an illustrative diagram in which the hinge pin 520 is assembled and inserted into a cavity of the rotatable shaft 505. FIG. 9 shows an illustrative cutout diagram of the assembled hinge system. The hole 905 on the primary smartphone's hinge pin receives the locking pin 530 and dually locks the primary and companion smartphones' respective hinge pins in place (FIG. 5). A compression system is employed to tightly compress the hinge pin and rotatable shaft to each other. This compression methodology can reliably secure these components in place and prevent any of the components from loosening. The spring-loaded tabs 605 enable a user to manipulate (e.g., rotate) the companion smartphone 105 in which the pressure exerted on the smartphone 105 translates to the springs 610 on the spring-loaded tabs 605. The pressure causes the springs to compress, and thereby the tabs disengage from the notches 705 on the hinge pin 520. As the rotatable shaft continues to rotate, responsive to the user's manipulation of the smartphone, the spring-loaded tabs lock into place when the tabs and notches align again (e.g., every 45° in this example).

In typical implementations, the spring-loaded tabs 605 are evenly spaced about 360°. While FIGS. 6-8 show eight spring-loaded tabs and notches spaced every 45°, other implementations can have fewer or more spring-loaded tabs and notches that may or may not be evenly spaced. For example, the spring-loaded tabs may be positioned at particular locations to enable the smartphone to snap into particular hinged positions (e.g., 45° and 315° angles only). While reference numerals and discussions for FIGS. 6-9 are tailored to components on the companion smartphone, such discussion likewise applies to the primary smartphone.

Figure 10:
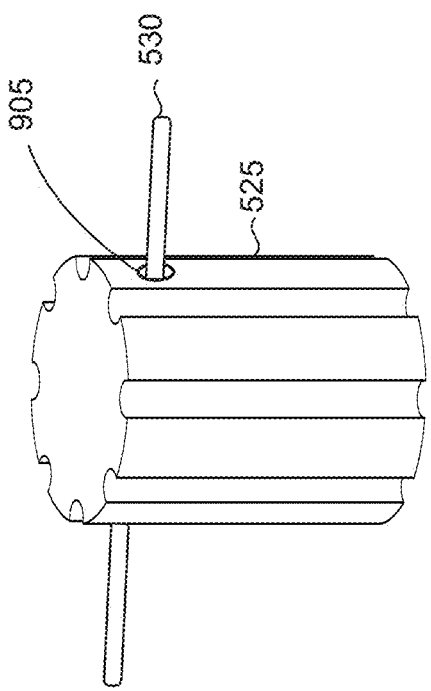
FIG. 10 shows an illustrative representation of the hinge pin and locking pin.

FIGS. 10 and 11 show illustrative diagrams of the hinge pin 525 and locking pin 530. The primary smartphone's hinge pin 525 includes a hole 905 to receive the locking pin 530. The hinge pin 520 on the companion smartphone 105 likewise has a hole 1105 through which the locking pin extends.

FIG. 11 depicts a scenario in which the primary and companion smartphones are adjacent to one another and ready for connecting. The user can slide the sliding element 150 over to the companion smartphone (FIGS. 2-4), responsive to which the locking pin locks into the companion smartphone's hinge pin 520. The locking pin dually locks into each smartphone's hinge pin 520 and 525. The locking pin may maintain the connection to the primary smartphone's hinge pin 525 since the sliding element to which it attaches will typically revert to the cutout on the primary smartphone. Thus, the locking pin may engage and disengage from the hinge pin 520 on the companion smartphone 105 but, in typical implementations, maintains a connection to the primary smartphone's hinge pin 525.

Figure 12A:
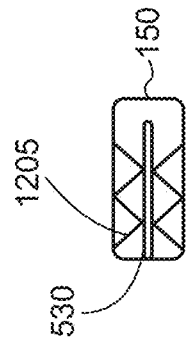
FIGS. 12A-D shows an illustrative representation of a sliding element operating with locking and hinge pins.
Figure 12B:
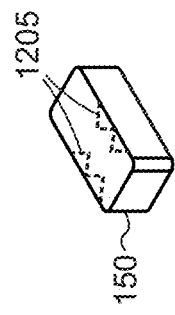
Figure 12C:
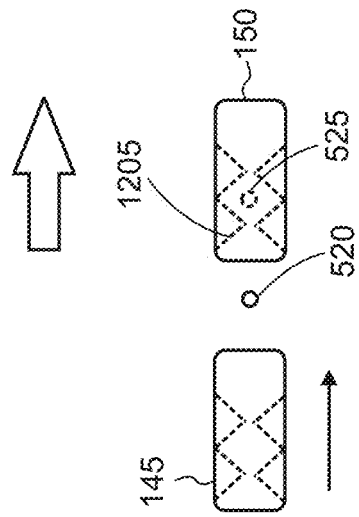
Figure 12D:
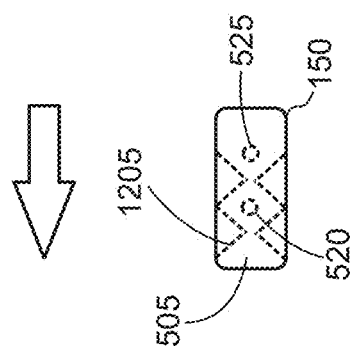

FIGS. 12A-D show illustrative diagrams of the primary smartphone's sliding element 150 from various angles to show the various components and their configuration within the connecting system. FIGS. 12A, 12C, and 12D represent a top view of the sliding element, and FIG. 12B represents an underside view of the sliding element and its components. Dashed lines represent that which is beneath the sliding element.

The sliding element includes a locking mechanism 1205, which locks into the primary smartphone's hinge pin 525 and the companion smartphone's hinge pin 520 with sufficient manual exertion from a user. The locking mechanisms in this example structurally function as a cotter pin or a split pin such that the hinge pins can be locked or unlocked from the sliding element with sufficient force to overcome a respective groove. For example, FIG. 12C shows how the primary smartphone's sliding element 150 has been slid over to overlap with the companion smartphone (FIG. 4). Here, the sliding element's locking pin engages with the hole in each hinge pin and thereby prevents movement relative to the rotating shaft (not shown). Its locking mechanism secures the sliding element to each hinge pin. In FIG. 12D, the sliding element 150 has been slid back over to the primary smartphone's cutout. The locking mechanism on the sliding element and the locking pin disengages from the companion smartphone's hinge pin 520. The primary smartphone's hinge pin is then placed within a new groove within the locking mechanism, as shown in FIG. 12D. The companion smartphone's sliding element 145 can move back over to its hinge pin 520 and lock into place using its own locking mechanism to protect the hinge pin from exposure and damage.

The combination of the locking mechanism 1205 and locking pin 530 enable the locking pin to dually and simultaneously connect each smartphone's hinge pin and connect the smartphones. The locking mechanism is implemented so the connection does not come undone without sufficient user pressure (e.g., manually sliding the sliding element back over to the primary smartphone 110).

FIG. 13 shows an illustrative alternate embodiment in which a primary smartphone 1360 and companion smartphone 1355 may connect using one or more magnetic connections. Each smartphone may utilize magnets 1345 and 1350, which attract each other and establish a magnetic connection when adjacently positioned or within magnetic range. Magnets 1345 and 1350 may be permanent magnets, but other magnets may also be used, such as electromagnets, ferromagnets, etc.

The magnets may have different positive or negative polarities to enable attraction. The magnets may be adapted to rotate within respective cavities so that, for example, the magnets correspondingly rotate and maintain their connections as the smartphones are rotated about each other. Thus, for example, each magnet may have positive and negative polarities that rotate and attract. As one phone's edge is rotating about the other phone's edge, the magnets maintain their connection by rotating to maintain the connection. Alternatively, the magnets 1345, 1350 may be permanently affixed inside the smartphones and statically positioned.

In the magnetic connection embodiment, the connectors 1305, 1310 are magnetically charged to connect with the opposing phone's connector. The connectors and other components internal to the smartphones may be comprised of some metal, such as copper, steel, titanium, etc. In this embodiment, each smartphone has a spacer 1315, 1320 partially inside the housing and partially outside the housing. The spacers are spring-loaded and are meant to retract into the respective smartphone when the connectors rotate and occupy the spacer's area. For example, as discussed in greater detail below, the connectors can rotate to enable the smartphones to rotate about each other. The connectors' rotations can cause some pressure to be exerted against the spacers, which in turn causes the spacers to retract. The spacers can continue to retract and extend, responsive to the connectors' positions. The spacers help prevent water or debris from entering the respective smartphone's housing.

Electromagnetic wires (not shown in FIG. 13) for the companion and primary smartphones provide an electrical current to the connectors 1305, 1310. This current is used to enable a user to switch on and off the magnetic connection of the connectors. Thus, in one embodiment, the connectors are electromagnets that can be switched on and off.

The companion and primary smartphones 1355, 1360 may use proximity sensors 1335, 1340 to detect the other smartphone's presence. Detection of the other smartphone's presence can trigger one or each smartphone's electromagnets to be switched on and establish a connection with the opposing smartphone. The connector magnets may be the primary connection mechanism for the smartphones, and the elongated magnets 1345, 1350 may be secondary magnets that provide additional support and connection stability. The proximity sensors may be used with software that detects the physical presence of the other device. For example, upon the primary smartphone sensing the companion device's proximity within some short-range communication protocol, such as Bluetooth® or Wi-Fi, the proximity sensors can detect the physical presence of the other device, or at least the device's edge. Upon detection of the physical and communicative proximity of the smartphones, the smartphones may automatically trigger electromagnetism.

FIG. 14 shows an illustrative user interface 1400 in which a notification is prompted for the user to connect to the companion smartphone. Responsive to the user's input 1405 on the touchscreen display, the primary smartphone 1360 initiates the electromagnets, as representatively shown by numeral 1410. Initiating the electromagnets may include, for example, permitting the primary smartphone's internal battery to transmit an electric current through the electromagnetic wire 1760 for powering the connector 1310. A similar initiating tactic may be used for the companion smartphone. Alternatively, initiating the primary smartphone's electromagnets may automatically cause the companion smartphone's electromagnets to operate as well. For example, the companion smartphone may be in constant communication with the primary smartphone, or at least may be controllable via the primary smartphone. Thus, input and controls at the primary smartphone may likewise trigger corresponding operations at the companion smartphone since the smartphones are designed to be used together and, typically, by a unique or group of unique users.

FIG. 15 shows an illustrative representation in which the primary and companion smartphones 1360, 1355 are connected via magnetic attraction, as representatively shown by numeral 1405. The magnetic attraction may be realized at the elongated magnets 1345, 1350, and at the electromagnetic connectors 1305, 1310 responsive to the user's initiation (FIG. 14). When both smartphones are connected, one phone may charge the other phone depending on the user's preferences. For example, the user may select for the companion device to charge the primary device if the primary device's battery is running low, or vice versa.

Figure 16:
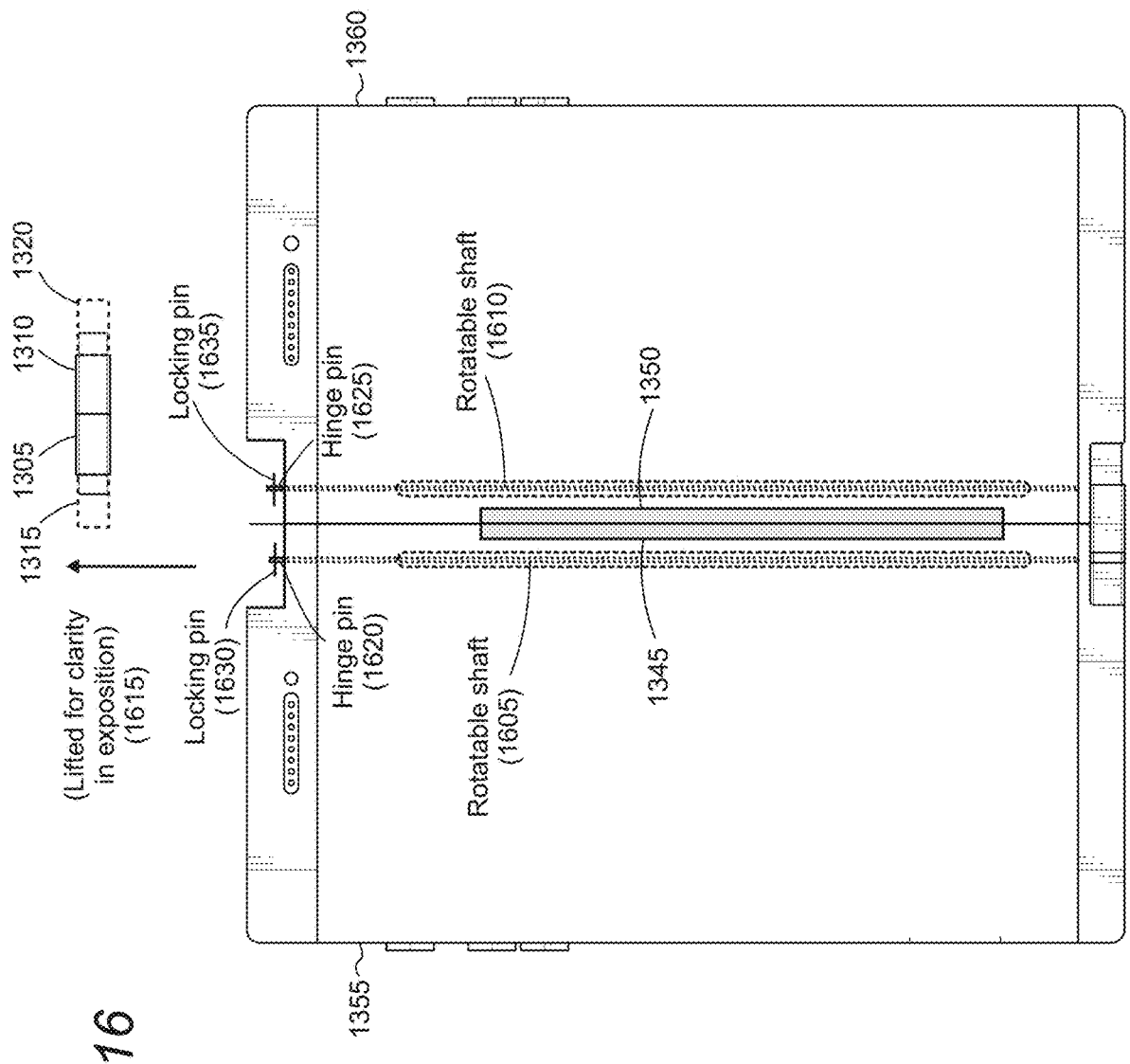
FIG. 16 shows an illustrative representation of the smartphones' operable components for connecting and rotating relative to each other.

FIG. 16 shows an illustrative representation in which the internal rotational mechanism configurations are depicted, and the connectors 1305, 1310, and spacers 1315, 1320 have been lifted to expose components and for clarity in exposition 1615. In the magnetic implementation, the rotatable shafts 1605, 1610 rotate about their respective hinge pins 1620, 1625. The rotatable shafts extend from the upper half to the lower half of the devices, and their exact length may vary depending on the implementation. Relative to the embodiment shown in FIG. 5, the rotatable shafts are located a more considerable distance from the top and bottom of the smartphones to accommodate the components necessary to enable the magnetic connections, such as the wires, as discussed in greater detail below. The hinge pins are shown extending from a top to a bottom of the smartphones—broken lines illustrate that which is internal to the device, and the solid lines represent that which is externally exposed from the smartphones. Each hinge pin 1620, 1625 utilizes its own locking pin 1630, 1635 to prevent the hinge pins from moving relative to the rotatable shaft and smartphone when manipulated and rotated.

In some implementations, the hinge pins 1620, 1625 may be permanently fixed in place within the smartphones. For example, the hinge pins may be fastened to the smartphone's interior via screws, bolts, welded, etc. In this implementation, the hinge pins function as cylindrical components that the rotatable shafts use for rotating the smartphone. In this implementation, the connectors may be permanently affixed to their respective cylinders, such as by locking pins or other fastening mechanisms, such as a bolt, screw, welded together, etc. For example, the hinge pins may be welded to a top inside surface of their respective connectors to provide greater durability.

FIG. 17 shows an illustrative representation in which the hinge pins 1620, 1625 include holes through which locking pins 1630, 1635, and coiled rods 1710, 1720 extend. The electromagnetic wires 1755, 1760 for the coiled rods are routed through the hinge pins' internal cavity and then connected to the coil 1705, 1715. The coil may be the same wire routed through the hinge pins 1620, 1625, or a different wire connected to the routed wire. The wires 1755, 1760 escape the hinge pin through holes 1745, 1750 and connect to or from the coil 1705, 1715 in this embodiment. The coil around the rods creates the electromagnetic attraction when electrical current is routed from the respective smartphone's batteries.

While the wires 1755, 1760 are shown routed through the hinge pins 1620, 1625, the hinge pins may function as a cylindrical component connected to the connectors differently. For example, the cylinders may be connected to the connector via a bolt, screw, or welded together. The cylinders are used to enable the rotating of the smartphones via the rotatable shafts. Put differently, the cylinders may not have the locking pin holes or utilize a locking pin to connect to the connectors, and thus, in some implementations, may be characterized as cylinders.

FIGS. 18A-C show illustrative representations in which the connectors 1305, 1310 for the companion and primary smartphones, respectively, have locking mechanisms 1810, 1805 which lock the respective locking pins in place. The connectors 1635, 1630 are at least partially hollow to accommodate the various components underneath their housing and within their cavity. While FIGS. 18A and B depict the primary smartphone's connector, the companion smartphone's connector is configured similarly. The locking mechanisms in this example structurally function as a cotter pin or a split pin such that the hinge pins are locked into the connector. While the implementation in FIGS. 12A-D enables locking and unlocking the locking pin, the magnetic connection implementation may be permanent such that the connectors do not move from laterally.

FIG. 18B shows the locking pin 1635 within the locking mechanism 1805. FIG. 18C shows the locking pin intersecting with the hinge pin, such that a portion of the locking pin is within the hinge pin's hole. The same implementation is shown for the companion smartphone, in which the locking pin 1630 intersects with the hinge pin. The locking pin, accordingly, prevents the hinge pin from rotating.

Figure 19:
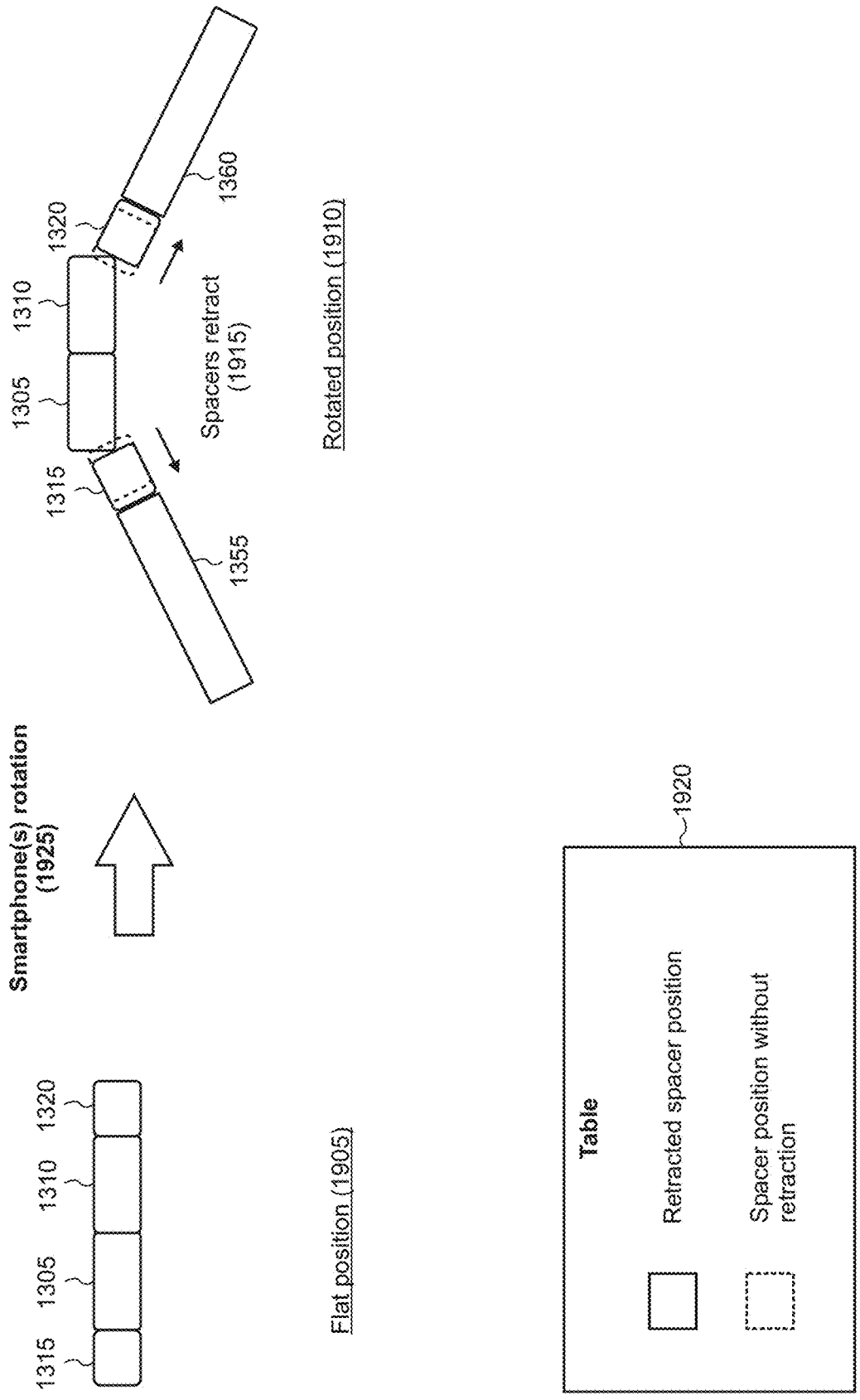
FIG. 19 shows an illustrative representation of the spacers' retraction and extension responsive to smartphone rotational movement.

FIG. 19 shows an illustrative representation in which the spacers 1315, 1320 for the companion and primary smartphones 1355, 1360 retract and extend responsive to the smartphone's rotation. In the flat position 1905, the spacers and connectors 1305, 1310 are relatively in sync and substantially touching. Retraction and extension may occur at the spacers when a user manipulates the connected smartphones and attempts to rotate the smartphones about each other. For example, responsive to smartphone rotation 1925, in the rotated position 1910, the spacers retract to accommodate the connectors' corners, as representatively shown by numeral 1915. Table 1920 shows the different spacer positions with and without retraction. The spacers may enter a cavity inside each smartphone (FIGS. 13-15, not shown in FIG. 19).

Figure 20:
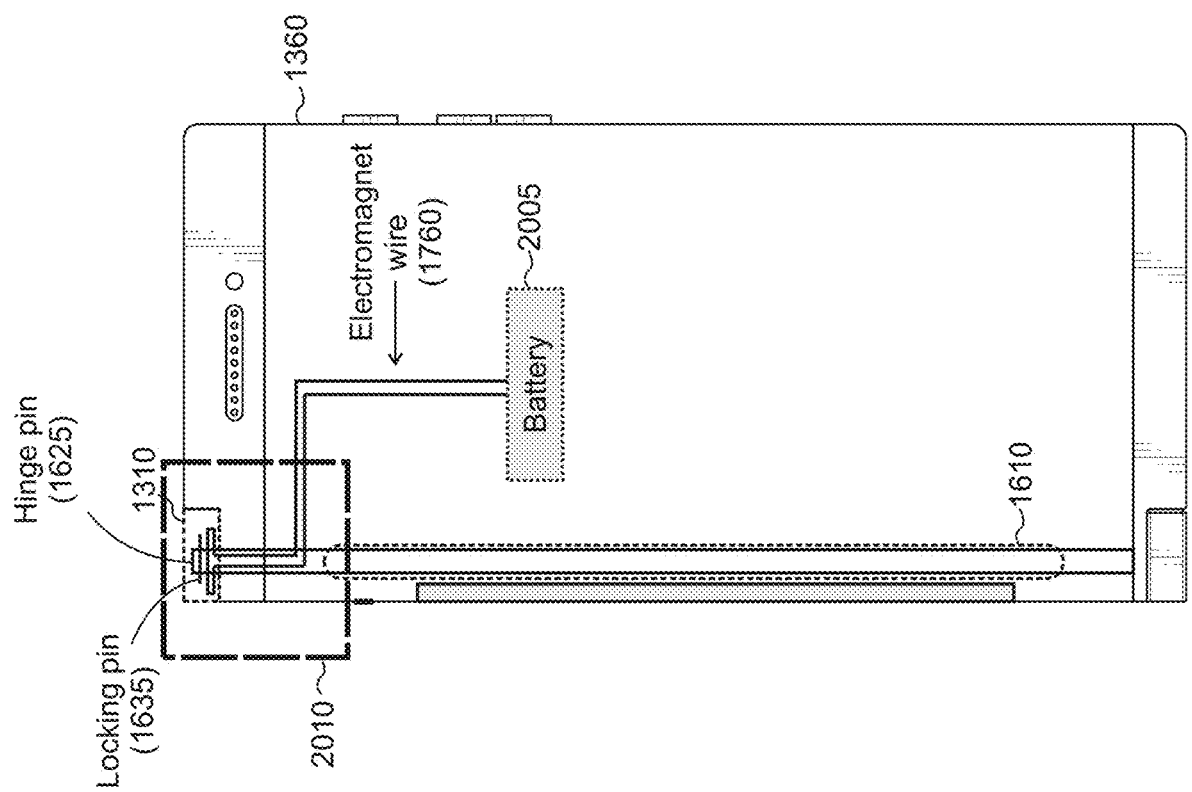
FIG. 20 shows an illustrative representation of the magnetic connection mechanism configuration.
Figure 21:
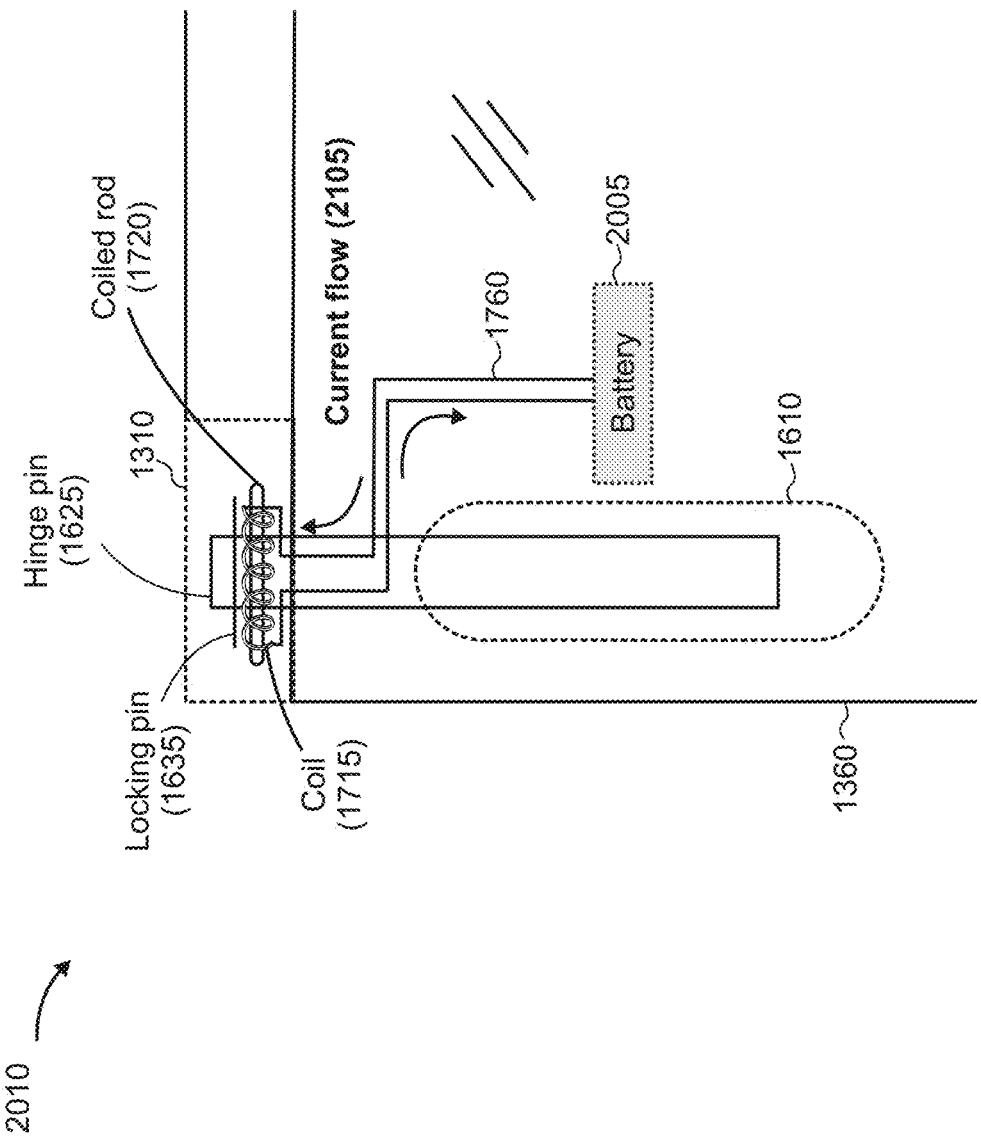
FIG. 21 shows an illustrative representation of the magnetic connection mechanism setup and electric current flow.
Figure 22:
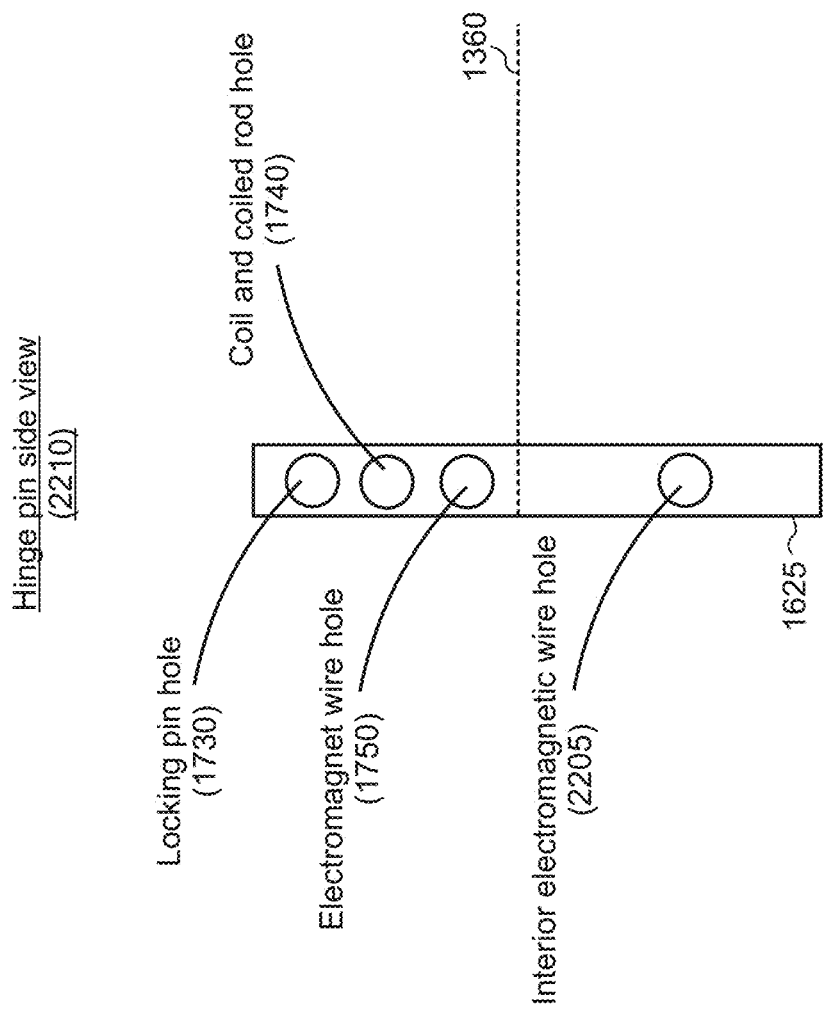
FIG. 22 shows an illustrative representation of the hole configuration on the primary and companion smartphones.

FIG. 20 shows an illustrative representation in which a battery 2005 provides an electrical current to the electromagnetic wire 1760, which creates the electromagnet connector 1310. The battery may be, for example, a lithium-ion (Li-Ion) rechargeable battery. While the primary smartphone connector is depicted in FIGS. 20-22, the mirror image design is utilized for the companion smartphone as well. The electric current may start after user initiation of the connection (FIG. 14) or be responsive to the proximity sensors detecting an adjacent phone.

FIG. 21 shows an illustrative representation of the portion 2010 from FIG. 20, in which the electromagnetic wire 1760 creates a current flow 2105 with the received electrical current. The current flow forms a completed circuit with coil 1715 and coiled rod 1720 to create the electromagnetic attraction. The wire 1760 is routed through the hinge pin's internal cavity so that the wire does not get tangled, damaged, or exposed when the primary or companion smartphones are rotated. The wire is secured with the hinge pin and connector 1310 when routed through the hinge pin's opening. Each end of the wire may be routed back to the battery to complete the circuit. In implementations in which the hinge pins function as cylinders attached to the connectors via welding, screw, bolt or other fastening mechanisms—and not using the locking pin—the wires are still routed through the cylinders' partially hollow interior.

FIG. 22 shows an illustrative representation of the hinge pin's side view, as representatively shown by numeral 2210. This view shows how the wires, locking pin, and coiled rod are routed through the hinge pin's various holes, partially depicted in FIG. 17. Below the smartphone's cutout and inside its housing, the hinge pin 1625 includes a hole 2205 to receive the electromagnetic wire 1760. That wire is then routed through the hinge pin and exits the electromagnetic wire hole 1750. An end of the wire connects to coil 1715, which creates electromagnetism. Although two distinct holes are shown for the wire and coiled rod, they may be combined into a single hole as well. Hole 2205 may be on one side of the hinge pin since the wire goes inside and up the cavity. The locking pin and coiled rod holes 1730, 1750 may be two-sided through the hinge pin since the pin and rod intersect with the hinge pin. The wire hole 1750 may typically be two-sided since the wire will extend to each side of the coil 1715.

Figure 23:
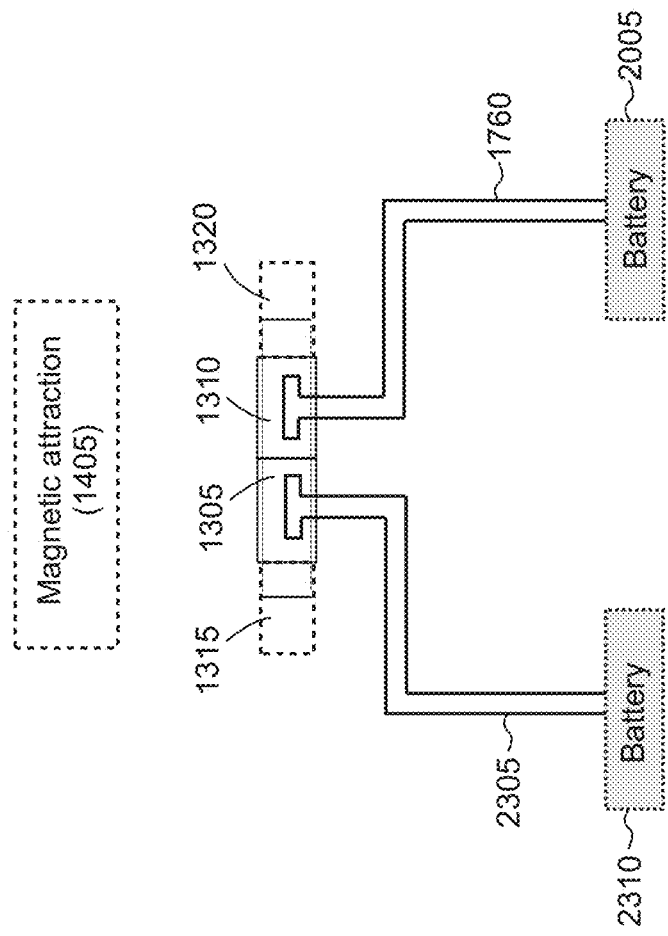
FIG. 23 shows an illustrative representation of the magnetic attraction between the primary and companion smartphones' magnetic connectors.

FIG. 23 shows an illustrative representation in which an initiated electromagnetic connection on the primary and companion smartphones are utilized to connect connectors 1310, 1305. The electromagnet wires 1760, 2305 deliver electric current from batteries 2005, 2310 to the connectors, creating electromagnetism. Each connector is configured with the coil and coiled rod inside the connectors, which creates the electromagnetic attraction. Once the electromagnets are initiated, the connectors connect to each other when touching or adjacently positioned. As mentioned previously, any discussions regarding the primary smartphone's magnetic implementation and components also apply to the companion smartphone's design.

Figure 24:
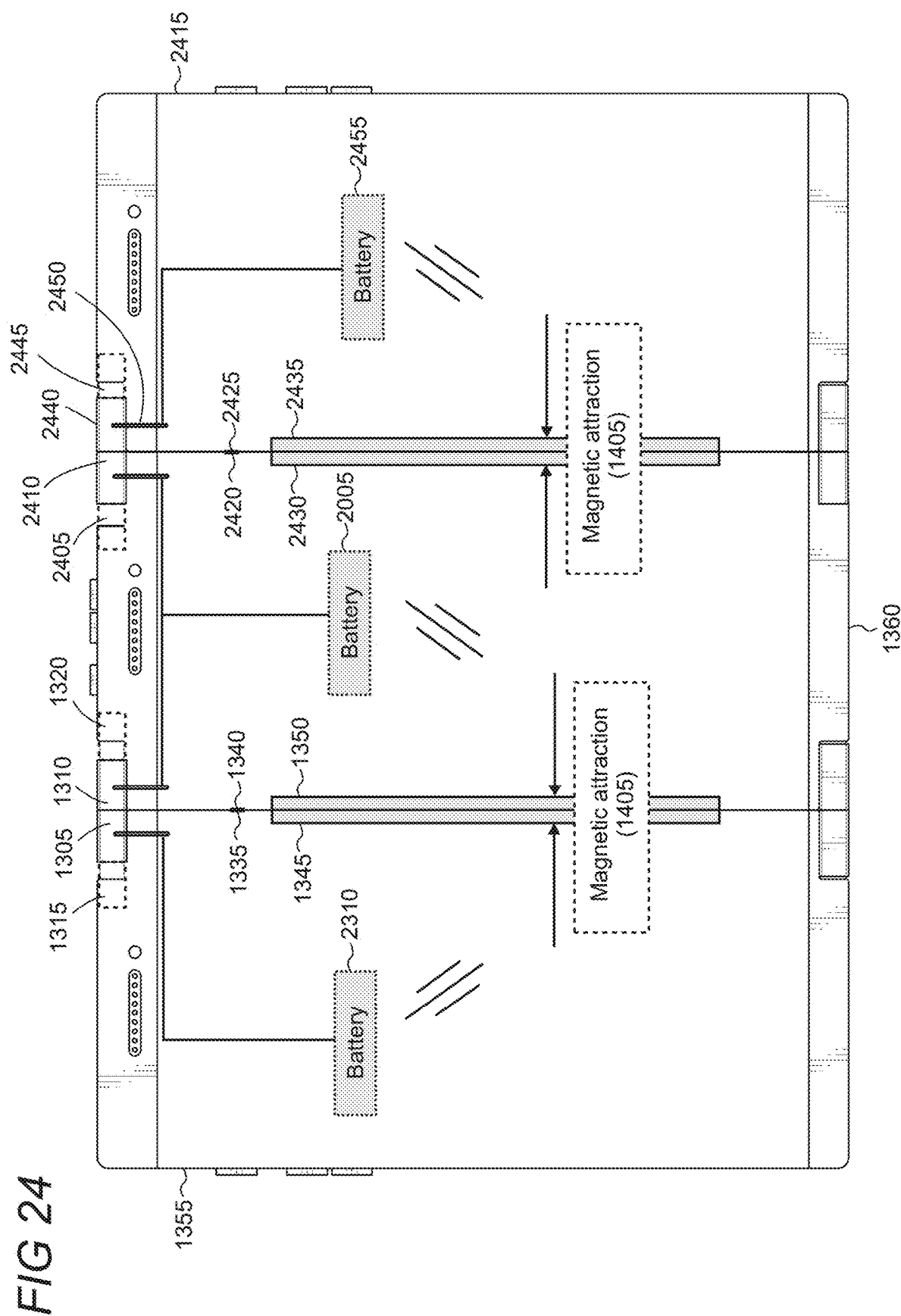
FIG. 24 shows an illustrative representation of three smartphones connected via the magnetic connection embodiment.

FIG. 24 shows an illustrative representation in which multiple smartphones may be connected to each other, and the connection mechanisms and designs disclosed herein may be utilized to create, for example, three connectible and foldable devices. For example, the right side of the primary smartphone 1360 is configured with a proximity sensor 2420, magnet 2430, spacer 2405, and connector 2410, each component functions similarly as discussed above. The right side connecting components of the primary smartphone connect to a tertiary smartphone 2415, configured with similar components to establish a magnetic connection. The tertiary smartphone includes, for example, a battery 2455 to initiate the electromagnetic connector, electromagnetic wire 2450, connector 2440, spacer 2445, battery 2455, magnet 2435, and proximity sensor 2425. These components may operate similarly to the like components discussed above regarding the companion and primary smartphones, as shown in FIGS. 13-23.

While three smartphones are shown connected to each other in FIG. 24, any number of smartphones and devices can be connected. For example, three, four, five, or more smartphones may be connected to each other. Furthermore, there may be multiple smartphones with double-sided connecting mechanisms (the middle phone in FIG. 24) that are connected to each other. Any combination of these doubleor single-sided connecting mechanism smartphones may be put together, so long as the connecting mechanisms are opposing.

Furthermore, while the connecting mechanisms in FIGS. 1-24 are shown with reference to computing devices connecting to each other, such as smartphones, tablet computers, laptop computers, etc., the connecting mechanisms can likewise be used on periphery or accessory devices. For example, attachable storage cases that are shaped similarly to the smartphones can have the connecting mechanisms depicted in the drawings. A front of the storage case can have a door that opens and closes and inside which the user can store items, such as credit cards, money, chewing gum, etc. The storage cases can have the sliding elements as discussed with respect to FIGS. 1-12, or the magnetic connection mechanisms as discussed with respect to FIGS. 13-24. These storage cases can fold about their smartphones as well. Since the connection mechanisms are all the same, a user can connect storage cases together as well. Additionally, the user can attach multiple storage cases to a single smartphone, as similarly done with the smartphones in FIG. 24. As another example, gaming consoles can utilize the connection mechanisms discussed herein, and thereby connect to additional gaming consoles, smartphones, or storage cases. The devices or gaming consoles can also attach to an additional display screen to provide the user with greater screen real estate.

Figure 25:
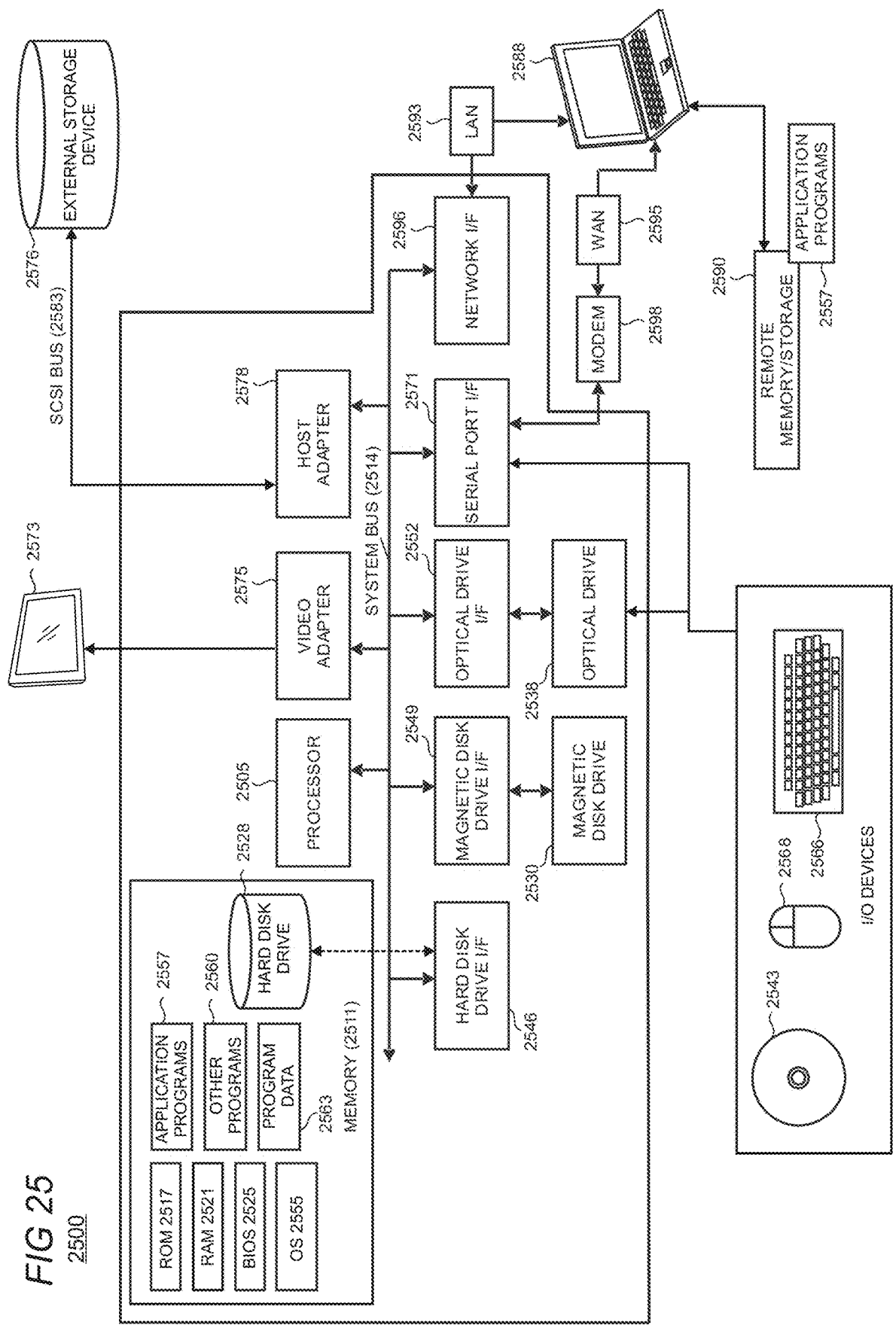
FIG. 25 shows an illustrative block diagram of a computing system, such as a smartphone computer, tablet computer, personal computer, laptop computer, which may be used to implement the features in the current disclosure.

FIG. 25 is a simplified block diagram of an illustrative computer system 2500 such as a smartphone, tablet computer, laptop computer, or personal computer (PC) which the present disclosure may be implemented. Computer system 2500 includes a processor 2505, a system memory 2511, and a system bus 2514 that couples various system components, including the system memory 2511 to the processor 2505. The system bus 2514 may be any of several types of bus structures, including a memory bus or memory controller, a peripheral bus, or a local bus using any of a variety of bus architectures. The system memory 2511 includes read-only memory (ROM) 2517 and random access memory (RAM) 2521. A basic input/output system (BIOS) 2525, containing the basic routines that help transfer information between elements within the computer system 2500, such as during startup, is stored in ROM 2517. The computer system 2500 may further include a hard disk drive 2528 for reading from and writing to an internally disposed hard disk, a magnetic disk drive 2530 for reading from or writing to a removable magnetic disk (e.g., a floppy disk), and an optical disk drive 2538 for reading from or writing to a removable optical disk 2543 such as a CD (compact disc), DVD (digital versatile disc), or other optical media. The hard disk drive 2528, magnetic disk drive 2530, and optical disk drive 2538 are connected to the system bus 2514 by a hard disk drive interface 2546, a magnetic disk drive interface 2549, and an optical drive interface 2552, respectively. The drives and their associated computer-readable storage media provide non-volatile storage of computer-readable instructions, data structures, program modules, and other data for the computer system 2500. Although this illustrative example includes a hard disk, a removable magnetic disk 2533, and a removable optical disk 2543, other types of computer-readable storage media which can store data that is accessible by a computer such as magnetic cassettes, Flash memory cards, digital video disks, data cartridges, random access memories (RAMs), read-only memories (ROMs), and the like may also be used in some applications of the present disclosure. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk, optical disk 2543, ROM 2517, or RAM 2521, including an operating system 2555, one or more application programs 2557, other program modules 2560, and program data 2563. A user may enter commands and information into the computer system 2500 through input devices such as a keyboard 2566, pointing device (e.g., mouse) 2568, or touch-screen display 2573. Other input devices may include a microphone, joystick, game pad, satellite dish, scanner, trackball, touchpad, touch-sensitive device, voice-command module or device, user motion or user gesture capture device, or the like. These and other input devices are often connected to the processor 2505 through a serial port interface 2571 that is coupled to the system bus 2514, but may be connected by other interfaces, such as a parallel port, game port, or universal serial bus (USB). A monitor 2573 or other type of display device is also connected to the system bus 2514 via an interface, such as a video adapter 2575. In addition to the monitor 2573, personal computers typically include other peripheral output devices (not shown), such as speakers and printers. The illustrative example shown in FIG. 25 also includes a host adapter 2578, a Small Computer System Interface (SCSI) bus 2583, and an external storage device 2576 connected to the SCSI bus 2583.

The computer system 2500 is operable in a networked environment using logical connections to one or more remote computers, such as a remote computer 2588. The remote computer 2588 may be selected as another personal computer, a server, a router, a network PC, a peer device, or other common network node, and typically includes many or all of the elements described above relative to the computer system 2500, although only a single representative remote memory/storage device 2590 is shown in FIG. 25. The logical connections depicted in FIG. 25 include a local area network (LAN) 2593 and a wide area network (WAN) 2595. Such networking environments are often deployed, for example, in offices, enterprise-wide computer networks, intranets, and the Internet.

When used in a LAN networking environment, the computer system 2500 is connected to the local area network 2593 through a network interface or adapter 2596. When used in a WAN networking environment, the computer system 2500 typically includes a broadband modem 2598, network gateway, or other means for establishing communications over the wide area network 2595, such as the Internet. The broadband modem 2598, which may be internal or external, is connected to the system bus 2514 via a serial port interface 2571. In a networked environment, program modules related to the computer system 2500, or portions thereof, may be stored in the remote memory storage device 2590. It is noted that the network connections shown in FIG. 25 are illustrative and other means of establishing a communications link between the computers may be used depending on the specific requirements of an application of the present disclosure.

Figure 26:
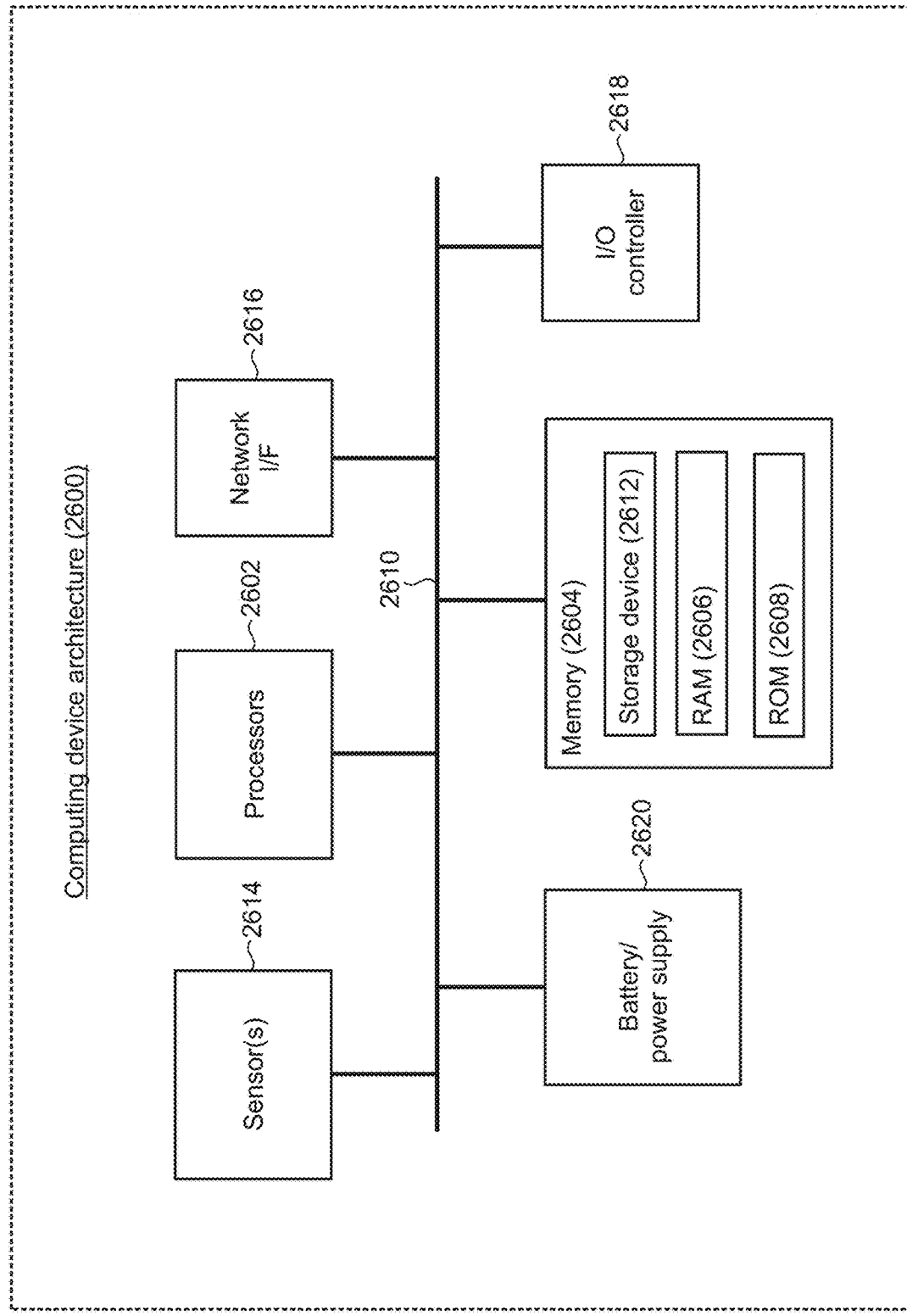
FIG. 26 shows an illustrative block diagram of a computing system, such as the earbud charging case or computer, that may be used to implement the present charging case.

The architecture 2600 illustrated in FIG. 26 includes one or more processors 2602 (e.g., central processing unit, dedicated AI chip, microcontroller, graphics processing unit, etc.), a system memory 2604, including RAM (random access memory) 2606, ROM (read-only memory) 2608, and long-term storage devices 2612. The system bus 2610 operatively and functionally couples the components in the architecture 2600. A basic input/output system containing the basic routines that help to transfer information between elements within the architecture 2600, such as during startup, is typically stored in the ROM 2608. The architecture 2600 further includes a long-term storage device 2612 for storing software code or other computer-executed code that is utilized to implement applications, the file system, and the operating system. The storage device 2612 is connected to processor 2602 through a storage controller (not shown) connected to bus 2610. The storage device 2612 and its associated computer-readable storage media provide non-volatile storage for the architecture 2600. Although the description of computer-readable storage media contained herein refers to a long-term storage device, such as a hard disk or CD-ROM drive, it may be appreciated by those skilled in the art that computer-readable storage media can be any available storage media that can be accessed by the architecture 2600, including solid-state drives and flash memory.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read-only memory), EEPROM (electrically erasable programmable read-only memory), Flash memory or other solid-state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2600.

According to various embodiments, the architecture 2600 may operate in a networked environment using logical connections to remote computers through a network. The architecture 2600 may connect to the network through a network interface unit 2616 connected to the bus 2610. It may be appreciated that the network interface unit 2616 also may be utilized to connect to other types of networks and remote computer systems. The architecture 2600 also may include an input/output controller 2618 for receiving and processing input from a number of other devices, including a keyboard, mouse, touchpad, touch-screen, control devices such as buttons and switches or electronic stylus (not shown in FIG. 26). Similarly, the input/output controller 2618 may provide output to a display screen, user interface, a printer, or other type of output device (also not shown in FIG. 26).

It may be appreciated that any software components described herein may, when loaded into the processor 2602 and executed, transform the processor 2602 and the overall architecture 2600 from a general-purpose computing system into a special-purpose computing system customized to facilitate the functionality presented herein. The processor 2602 may be constructed from any number of transistors or other discrete circuit elements, which may individually or collectively assume any number of states. More specifically, processor 2602 may operate as a finite-state machine in response to executable instructions contained within the software modules disclosed herein. These computer-executable instructions may transform the processor 2602 by specifying how the processor 2602 transitions between states, thereby transforming the transistors or other discrete hardware elements constituting the processor 2602.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

The computing device's sensors 2614 may include any number of sensors, including a battery life sensor which detects a connection with the earbuds or battery and which detect a battery life of the respective component. This information may be transmitted to the processor which responsively controls the charging status and indicator lights. The battery supply 2620 may be a rechargeable lithium-ion (Li-ion) so that the case can receive and store a charge, and pass that charge via the charging points to a connected pair of earbuds and removable batteries.

Various exemplary embodiments are disclosed herein. In one embodiment, disclosed is a primary computing device configured to detachably connect to a companion computing device, comprising: a connector configured with magnetism, in which the connector is positioned at or adjacent to an edge of the primary computing device; and a rotatable shaft positioned inside the primary computing device and which extends from a top half portion to a lower half portion of the primary computing device, wherein the rotatable shaft is positioned directionally beneath the connector.

In another example, the connector is a permanent magnet. As another example, the connector is a temporary magnet such that the connector's magnetism is switchable on and off. As another example, further comprising a wire routed from the primary computing device's battery to the connector for delivering an electrical current to initiate the connector's electromagnetism. In another example, the wire forms a coil at the connector. As a further example, the connector is attached to the primary computing device and prevented from lateral movement. In another example, the connector is attached to the primary computing device at a center region of the connector. As another example, the primary computing device is rotatable about the connector. In another example, a spacer positioned laterally adjacent to the connector, wherein the spacer retracts and extends responsive to external pressure from the connector. As another example, further comprising a cylinder that at least partially overlaps with the rotatable shaft within the primary computing device, wherein the cylinder extends into the connector's cavity. As another example, the wire is routed through the cylinder and to the connector. In another example, further comprising a proximity sensor that detects a presence of the companion computing device, in which the primary computing device switches on the temporary magnet responsively to the companion computing device's detection of the companion computing device.

As another exemplary embodiment, disclosed is a primary computing device configured to detachably connect to a companion computing device, comprising: a connector configured with magnetism, in which the connector is positioned at or adjacent to an edge of the primary computing device, wherein the connector is attached to the primary computing device and prevented from lateral movement, wherein the primary computing device is rotatable about the connector; and a wire routed from the primary computing device's battery to the connector for delivering an electrical current to initiate the connector's electromagnetism. In another example, a wire forms a coil at the connector. As another example, further comprising a cylinder that extends from the interior of the primary computing device to the connector, in which the wire is at least partially routed through the cylinder to the connector. In another example, further comprising a spacer positioned laterally adjacent to the connector, wherein the spacer retracts and extends responsive to external pressure from the connector. In another example, a rotatable shaft positioned inside the primary computing device and which extends from a top half portion to a lower half portion of the primary computing device. In another example, the rotatable shaft is positioned directionally beneath the connector. In another example, the cylinder at least partially overlaps with the rotatable shaft within the primary computing device. As a further example, the companion computing device includes a connector and wire, the companion computing device's connector being a mirror image of the primary computing device's connector, such that the connectors engage with each other.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A primary computing device configured to detachably connect to a companion computing device, comprising:
   a connector configured with magnetism, in which the connector is positioned at or adjacent to an edge of the primary computing device; and
   a rotatable shaft positioned inside the primary computing device and which extends from a top half portion to a lower half portion of the primary computing device,
   wherein the rotatable shaft is positioned directionally beneath the connector.

2. The primary computing device of claim 1, wherein the connector is a permanent magnet.

3. The primary computing device of claim 1, wherein the connector is a temporary magnet such that the connector's magnetism is switchable on and off.

4. The primary computing device of claim 3, further comprising a wire routed from the primary computing device's battery to the connector for delivering an electrical current to initiate the connector's electromagnetism.

5. The primary computing device of claim 4, wherein the wire forms a coil at the connector.

6. The primary computing device of claim 5, wherein the connector is attached to the primary computing device and prevented from lateral movement.

7. The primary computing device of claim 6, wherein the connector is attached to the primary computing device at a center region of the connector.

8. The primary computing device of claim 7, wherein the primary computing device is rotatable about the connector.

9. The primary computing device of claim 8, further comprising a spacer positioned laterally adjacent to the connector, wherein the spacer retracts and extends responsive to external pressure from the connector.

10. The primary computing device of claim 8, further comprising a cylinder that at least partially overlaps with the rotatable shaft within the primary computing device, wherein the cylinder extends into the connector's cavity.

11. The primary computing device of claim 10, wherein the wire is routed through the cylinder and to the connector.

12. The primary computing device of claim 3, further comprising a proximity sensor that detects a presence of the companion computing device, in which the primary computing device switches on the temporary magnet responsively to the companion computing device's detection of the companion computing device.

13. A primary computing device configured to detachably connect to a companion computing device, comprising:
    a connector configured with magnetism, in which the connector is positioned at or adjacent to an edge of the primary computing device, wherein the connector is attached to the primary computing device and prevented from lateral movement, wherein the primary computing device is rotatable about the connector; and
    a wire routed from a primary computing device battery to the connector for delivering an electrical current to initiate the connector's electromagnetism.

14. The primary computing device of claim 13, wherein the wire forms a coil at the connector.

15. The primary computing device of claim 13, further comprising a cylinder that extends from the interior of the primary computing device to the connector, in which the wire is at least partially routed through the cylinder to the connector.

16. The primary computing device of claim 15, further comprising a spacer positioned laterally adjacent to the connector, wherein the spacer retracts and extends responsive to external pressure from the connector.

17. The primary computing device of claim 15, a rotatable shaft positioned inside the primary computing device and which extends from a top half portion to a lower half portion of the primary computing device.

18. The primary computing device of claim 17, wherein the rotatable shaft is positioned directionally beneath the connector.

19. The primary computing device of claim 18, wherein the cylinder at least partially overlaps with the rotatable shaft within the primary computing device.

20. The primary computing device of claim 13, wherein the companion computing device includes a connector and wire, the companion computing device's connector being a mirror image of the primary computing device's connector, such that the connectors engage with each other.

* * * * *